United States Patent
Tsang

(10) Patent No.: US 7,792,014 B2
(45) Date of Patent: Sep. 7, 2010

(54) METHOD OF SKIPPING NULLIFIED PACKETS DURING MASS REPLAY FROM REPLAY BUFFER

(75) Inventor: Siukwin Tsang, Daly City, CA (US)

(73) Assignee: Integrated Device Technology, Inc., San Jose, CA (US)

(*) Notice: Subject to any disclaimer, the term of this patent is extended or adjusted under 35 U.S.C. 154(b) by 377 days.

(21) Appl. No.: 11/863,727

(22) Filed: Sep. 28, 2007

(65) Prior Publication Data

US 2009/0086735 A1    Apr. 2, 2009

(51) Int. Cl.
 *H04L 1/00* (2006.01)
(52) U.S. Cl. .................................. 370/216; 711/221
(58) Field of Classification Search ................ 370/216, 370/225, 392, 394, 474; 711/202, 212, 213, 711/216, 217, 218, 221
 See application file for complete search history.

(56) References Cited

U.S. PATENT DOCUMENTS

| | | | |
|---|---|---|---|
| 5,790,522 A | 8/1998 | Fichou et al. | |
| 5,842,224 A * | 11/1998 | Fenner | 711/202 |
| 5,987,008 A | 11/1999 | Simpson et al. | |
| 6,499,079 B1 | 12/2002 | Gulick | |
| 6,519,225 B1 | 2/2003 | Angle et al. | |
| 6,570,877 B1 | 5/2003 | Kloth et al. | |
| 6,654,381 B2 | 11/2003 | Dally et al. | |
| 6,661,788 B2 | 12/2003 | Angle et al. | |
| 6,738,371 B1 | 5/2004 | Ayres | |
| 6,850,490 B1 | 2/2005 | Woo et al. | |
| 6,888,831 B1 | 5/2005 | Hospodor et al. | |
| 6,898,182 B1 | 5/2005 | Cloonan | |
| 6,954,424 B2 | 10/2005 | Barrack et al. | |
| 7,426,185 B1 | 9/2008 | Musacchio et al. | |
| 7,480,246 B2 | 1/2009 | Agarwal et al. | |
| 7,522,624 B2 | 4/2009 | Barri et al. | |
| 2001/0052054 A1 * | 12/2001 | Franke et al. | 711/147 |
| 2002/0146037 A1 | 10/2002 | Sugaya et al. | |
| 2003/0169736 A1 * | 9/2003 | Lavigne et al. | 370/392 |
| 2003/0196025 A1 * | 10/2003 | Dahlen et al. | 711/103 |
| 2004/0066673 A1 | 4/2004 | Perego et al. | |
| 2005/0034049 A1 | 2/2005 | Nemawarkar et al. | |
| 2006/0017497 A1 | 1/2006 | Mo et al. | |
| 2006/0018170 A1 | 1/2006 | Au et al. | |
| 2006/0018176 A1 | 1/2006 | Au et al. | |
| 2006/0018177 A1 | 1/2006 | Au et al. | |
| 2006/0020741 A1 | 1/2006 | Au et al. | |
| 2006/0020742 A1 | 1/2006 | Au et al. | |
| 2006/0020743 A1 | 1/2006 | Au et al. | |
| 2006/0020761 A1 | 1/2006 | Au et al. | |
| 2006/0109789 A1 | 5/2006 | Skerritt | |

(Continued)

*Primary Examiner*—Chi H. Pham
*Assistant Examiner*—Kevin Mew
(74) *Attorney, Agent, or Firm*—Tracy Parris

(57) ABSTRACT

In PCI-Express and alike network systems, back-up copies of recently sent packets are kept in a replay buffer for resending if the original packet is not well received by an intended destination device. A method for locating the back-up copy in the retry buffer comprises applying a less significant portion of the sequence number of a to-be-retrieved back-up copy to an index table to obtain a start address or other locater indicating where in the retry buffer the to-be-retrieved back-up copy resides. A method for skipping replay of late nullified packets includes deleting from the index table, references to late nullified packets.

24 Claims, 8 Drawing Sheets

U.S. PATENT DOCUMENTS

2008/0072113 A1* 3/2008 Tsang et al. .............. 714/748
2008/0109570 A1* 5/2008 Leonard et al. ............ 710/22
2008/0126571 A1* 5/2008 Leonard et al. ............ 709/252

* cited by examiner

200

300

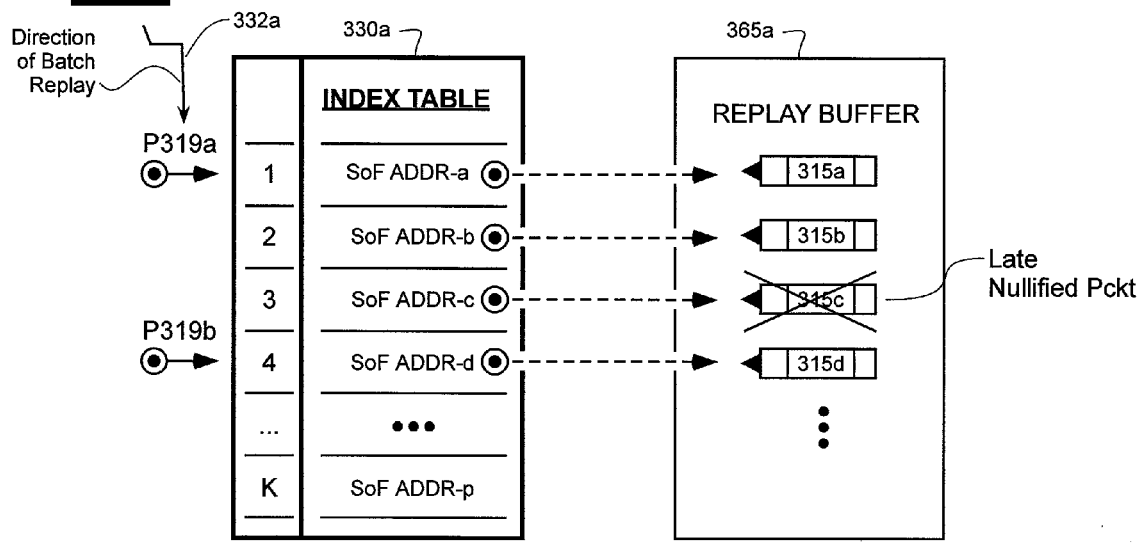
Fig. 3C 300'
BEFORE REBUILD,
BEFORE BATCH REPLAY
BUT AFTER FIRST TIME INDIVIDUAL PLAY-OUT'S
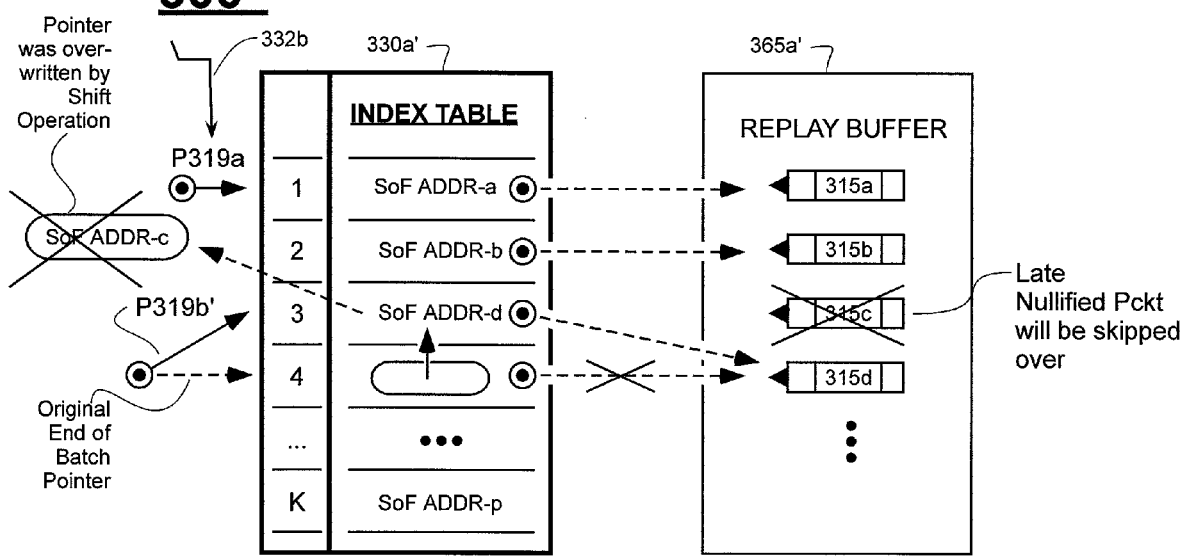
Fig. 3D 300"
AFTER REBUILD,
BEFORE BATCH REPLAY,
AND AFTER FIRST TIME INDIVIDUAL PLAY-OUT'S

METHOD OF SKIPPING NULLIFIED PACKETS DURING MASS REPLAY FROM REPLAY BUFFER

CROSS REFERENCE TO RELATED APPLICATIONS

The following copending U.S. patent applications are owned by the owner of the present application, and their disclosures are incorporated herein by reference:

(A) Ser. No. 11/514,281 filed Aug. 30, 2006 by Siukwin Tsang et al and which is originally entitled, Method of Locating Packet for Resend from Retry Buffer; and (B) Ser. No. 11/774,457 filed Jul. 6, 2007 by Siukwin Tsang et al and which is originally entitled, Integrated Memory for Storing Egressing Packet Data, Replay data and To-be Egressed Data; and (C) Ser. No. 11/854,076 filed Sep. 12, 2007 by Siukwin Tsang et al and which is originally entitled, Integrated Memory for Storing Egressing Packet Data, Replay data and To-be Egressed Data.

FIELD OF DISCLOSURE

The present disclosure of invention relates generally to network systems that transmit information in packet format. The disclosure relates more specifically to systems that resend packets from a retry or replay buffer when an initial transmission of one or more packets fails to reach a desired destination intact.

DESCRIPTION OF RELATED TECHNOLOGY

Use of digitally-encoded packets in data communication and/or networking systems is well known. Typically each packet is layered like an onion to have header-type outer shell sections, a payload or message core section and one or more error correction sections that cover various parts of the core and/or outer shells. Packets may be transmitted individually or as parts of relatively continuous streams or bursts depending on quality of service requirements and/or availability of transmission links. Sometimes, one or more packets are infected with error during transmission over a link and it is desirable to resend or "replay" the already once sent packet over the same link. Sometimes, one or more packets are infected with uncorrectable error during storage at an intermediate point, in which case it may become desirable to nullify the packet even though it is still in transit.

When a packet signal is transmitted from a source device to a receiving device, the packet signal that arrives at the receiving device typically progress through a consecutive series of packet signal processing layers referred to as: (1) the physical interface layer (PL), (2) the data link layer (DL) and (3) the transaction layer (TL). A fourth, core processing layer may be provided after the transaction layer for processing payload data contained within the packet. In the case where the receiving device provides signal routing functions, the core processing layer may include a switch fabric for selectively routing each packet from an entry or ingress point to one or more selected exit or egress points.

The physical interface layer (PL) of a packet processing device may include means for serializing and deserializing data (SERDES) and means for recognizing the start and end of each ingressing packet (the absolute start of frame and end of frame).

The data link layer (DL) may include means for managing error checking, error correction (e.g., ECC, CRC) and/or managing packet ordering and for verifying completion of sequences of interrelated packets.

The transaction layer (TL) may include means for parsing (peeling the onion skin layers of) different parts of each kind of post-DL packet so as to get to desired portions of the payload data or message data for respective core processing. Specific processing of the TL output data may be carried out by a so-called, File Data Processing Layer. Before it is sent to the File Data Processing Layer, payload and/or message data from sequentially ingressing packets may sometimes need to be reordered for purposes of reconstructing an original data sequence that is different from the ingress sequence, where the original data sequence may, for example, be required for reconstituting a rasterized graphic image. To this end, unique sequence numbers are often embedded in successive ones of ingressing or egressing packets so that desired ordering of data can be achieved in the receiving device.

Packet signals leaving a source device typically progress in the reverse order, namely, first by moving outgoing payload data from the file layer and through the transaction layer (TL) for attachment of transaction control code, then through the data link layer (DL) for attachment of sequence number code and error check code thereto, and finally through the sender's physical interface layer (PL) for encoding into a serial transmission format and output onto a physical transmission media (e.g., a high frequency cable or printed circuit strip or wireless transmission in some cases).

Because an output packet may fail to reach its targeted destination intact for any of a number of reasons (i.e., noise induced error), a backup copy of each egressing packet is often temporarily stored in a retry buffer (RB, also referred to as a replay buffer) of the source device for a short while. If the destination device sends a retry request and/or fails to timely acknowledge receipt, the backup copy is typically resent from the retry buffer.

One problem associated with resending the backup copy from the retry buffer is that of identifying and locating the correct packet or group of packets that is/are to be resent from the retry buffer. A variety of complex schemes may be devised. The present disclosure provides an elegant way of identifying and locating the correct packet(s) to be resent and of skipping over replay packets that for one reason or another have been nullified.

SUMMARY

A packets outputting device in accordance with the present disclosure includes a retry buffer for storing egressing and resendable packets in respective storage locations of the retry buffer and an index table for tracking the respective storage locations in the buffer of the resendable packets, where the packet storage locations are sorted according to unique sequence numbers assigned to the egressing and resendable packets.

Additionally, means are included for skipping during replay, over packets that have been late nullified (for example due to unrepairable soft error in memory). In one embodiment, a shifting means is coupled to the index table for shifting entries therein in so as to overwrite an entry pointing to a replay packet that has been nullified after first time play-out. When a retry request arrives (e.g., in the form of a negative acknowledge—a NAK), the retry request contains the sequence number of a first (i.e., oldest) among plural packets that have not yet been acknowledged by a link partner and are to be resent to the link partner. A less significant subset of bits forming the sequence number in the retry request is used to define an index into the index table. The correct fetch address (start-of-frame address) or other locater for the desired packet is stored at the indexed location in the index table. This fetch locater is output from the index table and applied to the retry buffer to locate and fetch the correct first packet from the retry buffer (i.e., the oldest not-yet-acknowledged packet). Additional SOF addresses (start-of-frame addresses) are fetched from the index table for yet other (i.e., younger) packets that have not yet been acknowledged and these too are replayed.

In one embodiment, the retry buffer operates somewhat like a FIFO that stores as many as the last 16 packets sent out. The index table also operates somewhat like a FIFO that stores the respective start-of-frame addresses of the up-to 16 packets stored in the retry buffer. The up-to 16 start addresses are accessible (i.e., CAM style) according to the corresponding, least significant four bits of the sequence numbers used by the 16 or fewer payload-containing packets that were sent out. When a retry request is received, the least significant four bits of the sequence number in the retry request are used to form the address signal applied to the index table. In response, the index table outputs the correct start-of-frame address for the desired packet whose contents are stored in the retry buffer and are to be resent. An end-of-index pointer points to the index of the youngest of the not-yet-acknowledged packets. When a packet belonging to the once-sent-but-not-yet-acknowledged group is nullified, its index entry is erased and entries below it (if any) are shifted up to close the gap. The end-of-index pointer is also shifted up.

A retry packet storing method in accordance with the disclosure comprises: (a) using at least part of a sequence number of a packet to be stored in a retry buffer for generating an index into an index table; (b) storing the packet in the retry buffer at a start address assigned to the packet; (c) recording the start address for the packet (or another locater of the packet) in the index table according to the generated index; (d) removing from the index table, entries that correspond to late nullified packets.

A retry packets fetching method in accordance with the disclosure comprises: (a) using at least part of a sequence number of a first packet to be fetched from a retry buffer for generating an index into an index table; (b) obtaining a locater (e.g., fetch address) for the to-be-fetched first packet from the index table according to the generated index; and (c) fetching the first packet from the retry buffer according to the locater obtained from the index table and thereafter automatically fetching further packets from the retry buffer according to further locaters obtained from the index table.

A retry buffer managing system in accordance with the disclosure comprises: (a) an index table for storing locaters (e.g., fetch addresses) of to-be-fetched packets stored in a retry buffer; (b) an index generator coupled to the index table for generating indexes into the index table, where the index generator is at least responsive to sequence numbers associated with packets to be stored or fetched from the retry buffer; (c) a retry buffer operatively coupled to the index table so as to receive read start addresses from the index table (or other forms of locaters) where the read start addresses (or corresponding locaters) are stored in the index table according to said indexes generated by the index generator; and (d) an index table reorganizer structured for removing from the index table, references to nullified packets. One embodiment of the retry buffer managing system further includes a validity checker for testing validity of sequence numbers applied to the index generator when fetching packets from the retry buffer. The validity testing includes a determining of whether supplied sequence numbers are in a range between the sequence number of a last-received Ack or NAK and the sequence number of a last-sent payload-carrying packet inclusively.

Other aspects of the disclosure will become apparent from the below detailed description.

BRIEF DESCRIPTION OF THE DRAWINGS

The below detailed description section makes reference to the accompanying drawings, in which:

FIGS. 3C-3D are respectively, before and after schematic diagrams showing how the index table is modified in response to detection of late nullification of a not-yet-acknowledged packet;

DETAILED DESCRIPTION

Figure 1A:
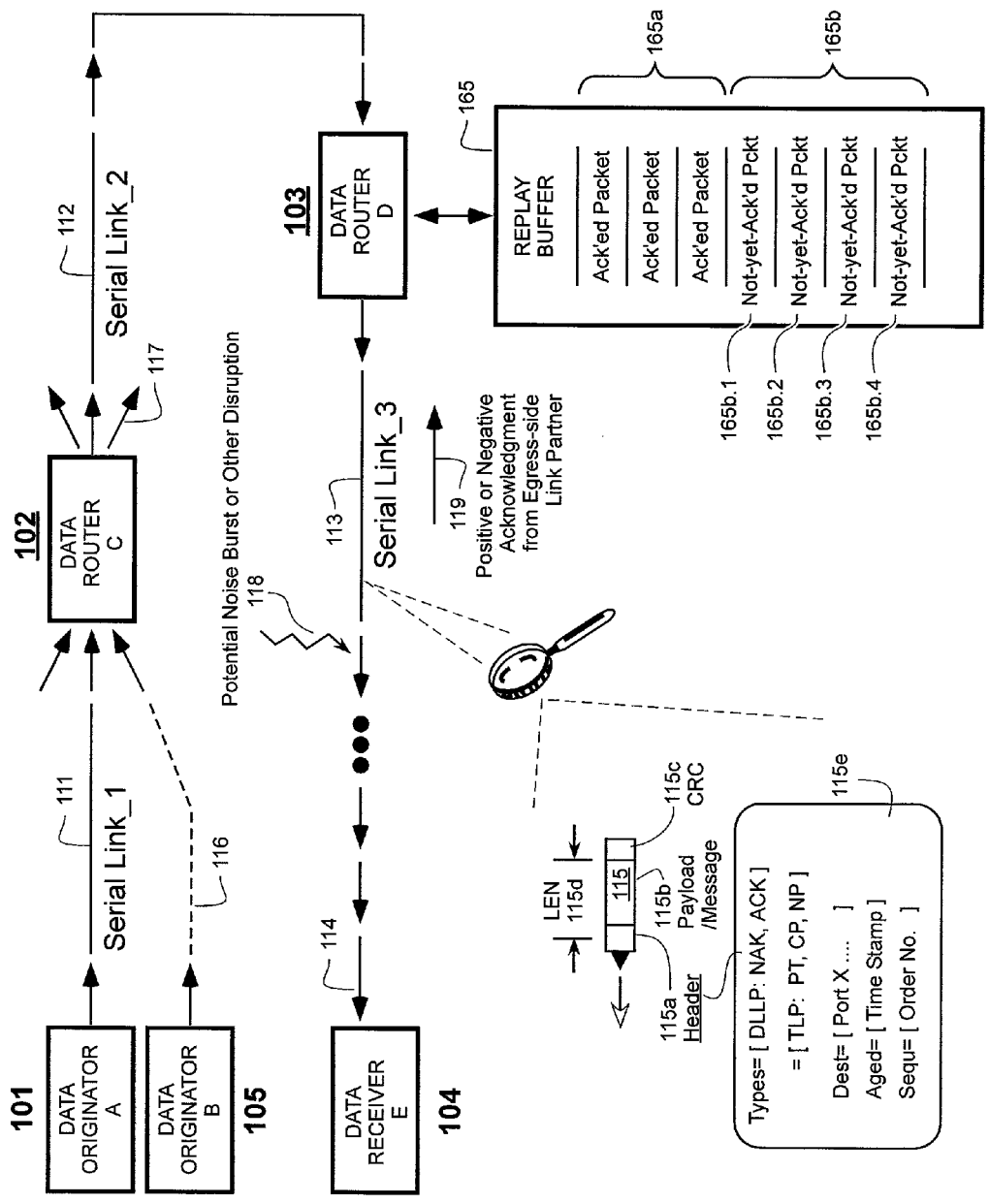
FIG. 1A is a block diagram showing a packet forwarding system that uses serial links to transmit packets and uses replay buffers (RB) for temporarily storing in-transit packets at intermediate points along their respective transmission paths.

Referring to FIG. 1A, shown is a system 100 that uses a serial interconnect networking technology such as PCI-Express™ version 1.0 for interconnecting a data originating, first device 101 (Originator) to a data receiving, fourth device 104 (Receiver) by way of a series of data routing and/or data processing intermediate devices, 102, 103, etc. Each of devices 101-104 (and fifth originator device 105) may be implemented as a monolithic integrated circuit (IC).

Data originator 101 sends one or more packets over a first serial link 111 for insertion into an ingress side of intermediate device 102. Data routing and/or data processing may occur inside of the first intermediate device 102 and then a corresponding one or more packets emerge from an egress side of device 102 for transmittal over a second serial link 112 to the second intermediate device 102. (In the case where device 102 provides packet routing services, device 102 may cause one or more of packets ingressing from serial link 111 to egress out along serial link 117 instead of out along serial link 112 and/or device 102 may cause one or more of packets ingressing from serial link 116 to egress out along a dynamically selected one of links 112 and 117. The links 111-114, 116-117 incidentally are generally bidirectional ones although for purpose of simplified explanation they are indicated to be carrying unidirectional data flows from originator 101 or 105 to destination 104.)

Similarly to what may happen in device 102, packet routing and/or data processing may occur inside of the second intermediate device 103 and then a corresponding one or more packets emerge from an egress side of device 103 for transmittal over a third serial link 113 for ultimate receipt by the targeted data receiver 104 via fourth serial link 114. In one embodiment, intermediate devices such as 102 and 103 function as packet routers which selectively route ingressing packets from perhaps different sources (e.g., originator 101 and originator 105) for egress along a serial path that leads to a desired destination device (e.g., 104).

High speed serial links are advantageous in that they generally require fewer interconnect resources than comparable parallel buses operating at lower frequencies where the comparable parallel buses provide similar data throughput rates. One disadvantage of high speed serial links though, is that they are sometimes disrupted by bursts of cross-talk or other kinds of noise. When a disruption 118 such as a burst of noise is encountered along a serial linkage path, the temporary disruption may cause one or more in-transit packets to fail to arrive intact, or at all, on the other side of the disruption-experiencing serial link (i.e., 113). In view of these problems, hand shaking is often used between link partners. For example, after the first intermediate device 102 sends a given packet (i.e., 115) over one of its egress side links, say link 112, the sending device awaits receipt of an acknowledgement signal over the same link 112 or by other means from the targeted link partner 103 where the acknowledgement indicates that the specific packet arrived and arrived intact (e.g., with no uncorrectable errors being detected by the receiving link partner 103). If the packet never arrives and therefore no acknowledgement (ACK) or negative acknowledgement (NAK) signal is returned by the distal link partner, then a timer expires inside the sending partner (e.g., 102) and the sending partner automatically resends the already one-time sent-out packet to the egress side link partner (103). If a packet arrives at the distal link partner (103) but does so with an uncorrectable error embedded in it (e.g., a set of bit flips or other errors that can be detected but not corrected by an ECC process utilized in device 103), the distal link partner (e.g., 103) returns a negative acknowledgement signal (NAK) to the packet transmitter (e.g., 102) indicating which packet was received but in defective or uncorrectable form. In response, the packet transmitter replays the identified packet over the link (112) when an available time slot for replay becomes available.

On the other hand, if a packet arrives at the distal link partner in perfect or fully correctable form (where correction is provided by the error-checking and correcting or ECC process provided in the downstream partner), then the distal link partner (e.g., 103) returns an affirmative acknowledgement signal (ACK) to the packet transmitter (e.g., 102) indicating which packet was received in acceptable form. The packet transmitter (e.g., 102) then relieves itself of the requirement to replay that particular packet by for example, erasing the packet from a local replay buffer.

FIG. 1A shows the local replay buffer 165 of intermediate device 103. This replay buffer 165 stores copies of packets that have been transmitted at least once over corresponding serial link 113. It is to be understood that each of devices 101, 105, 102 and 104 may contain a similar replay buffer and that these are not shown for sake of maintaining illustrative simplicity. Packet data stored inside replay buffer 165 may be divided into at least two subsets, a first subset 165*a* is formed by packets that have already been acknowledged (ACK'ed) and a second subset 165*b* is formed by packets that have not yet been acknowledged (Not-yet-ACK'd).

Let it be assumed that the reason for the replay buffer 165 being in illustrated state (FIG. 1A) is that a temporary disruption 118 occurred on link 113 and once-played out packets 165*b*.1 through 165*b*.3 never got through to the downstream link partner (not shown) on link 113. Let it be assumed that the once-played out and earliest in time packet, 165*b*.1 did partially get through to the downstream link partner as the link breakdown began, but with an uncorrectable error included in that packet 165*b*.1. Also let it be assumed that the acknowledgement watchdog timer (not shown) inside transmitter 103 has not yet reached its alarm limit for the respective, earliest transmitted packet 165*b*.1. As a result, transmitter 103 will next receive over link 113, a negative acknowledgement (NAK) signal 119 from its distal link partner (not shown) indicating that the oldest of the recently transmitted packets, 165*b*.1-165*b*.4 has been received, but in defective form.

At this point, data link controller (not shown) inside transmitter 103 can conclude that the more recently transmitted packets 165*b*.2 through 165*b*.4 will not successfully get through on link 113 either because the oldest of the once-played-out-but-not-yet-acknowledged packets, 165*b*.1 ran into trouble as is indicated by the received NAK signal (due to the start of temporary disruption 118). The data link controller (not shown) may then automatically conclude that it is desirable to replay (retransmit) all the packets in subset 165*b* over link 113 and to begin anew the wait for acknowledgements from its egress side link partner (not shown). A number of detailed problems emerge in this process. Firstly, it is necessary to identify which packets within the replay buffer 165 belong to subset 165*b* (the once-played-out-but-not-yet-acknowledged packets). Secondly it may be desirable to exclude from within a contiguous memory area (e.g., 165*b*) certain packets that for one reason or another are not to be included in the mass replay operation (in the grouped retransmittal of packets 165*b*.1 through 165*b*.4 over link 113).

The above-cited and here-incorporated U.S. patent application Ser. No. 11/514,281 (Method of Locating Packet for Resend from Retry Buffer) describes a method of using packet sequence numbers for identifying packets that are to be replayed. The present disclosure expands on that concept by showing how certain packets that, for one reason or another are to be excluded from a mass replay operation or from an individual replay operation can be so excluded within the context of a system that uses sequence numbers (or other consecutive index numbers) to identify packets.

Additionally, the above-cited U.S. Ser. No. 11/514,281 illustrated a system in which first-time playing packets were transmitted directly from a write side of the replay buffer to the egress port. However, in an embodiment of the present disclosure, playing-out packets are instead read out from the read side of the replay buffer before being transmitted even the first time out along the corresponding serial link to the respective egress port. Reasons for employing the latter approach are complex and are spelled out in the above-cited and here-incorporated U.S. patent application Ser. No. 11/774,457 (Integrated Memory for Storing Egressing Packet Data, Replay data and To-be Egressed Data). Briefly, a same memory can be used for storing data flows entering into it and leaving it at different instantaneous throughput rates. This is useful in systems where substantially different bandwidths can be allocated to various ones of ingress and egress data pipes. It is to be understood however that basic packet-by-passing concepts of the present disclosure may be practiced without use of the approach detailed in Ser. No. 11/774,457.

Figure 1B:
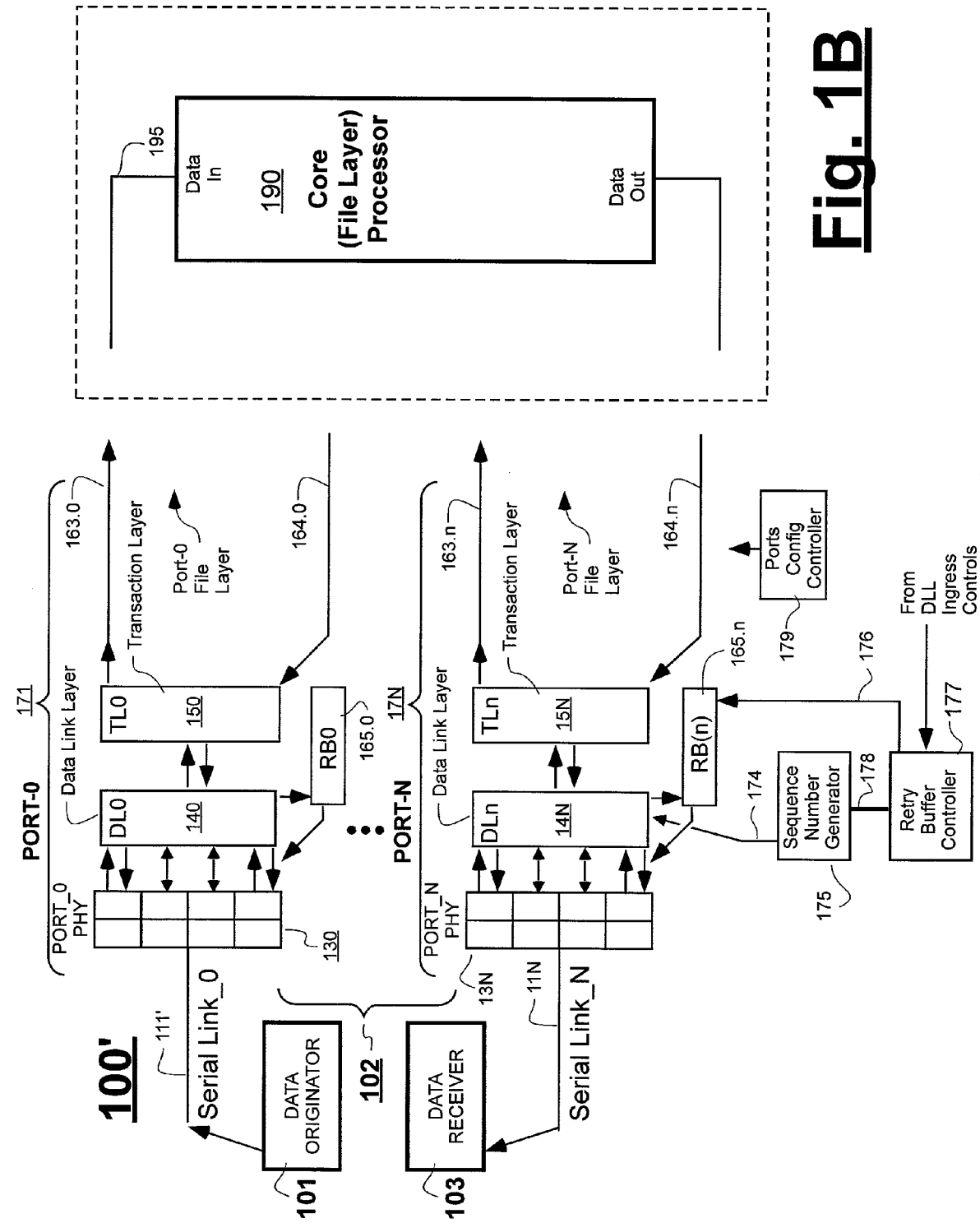
FIG. 1B is a block diagram showing a packet switching system having replay buffers (RB) for temporarily storing post-process packets that are being dispatched via respective egress links and may have to be resent.

Before delving into details of FIG. 1B, a brief review of packet signaling is undertaken here. Shown at 115 is a basic structure of an exemplary data packet such as may be used in PCI-Express™ version 1.0 or similar serially linked network systems. The data packet typically has a header section 115*a*, a payload or message section 115*b* and an error checking and/or correcting section (ECC or CRC) 115*c*. Each packet may have its own unique length 115*d* depending on its type and size of internal payload and/or message 115*b* contained therein. It is to be understood that each of links 111-114, 116, etc. carries digital data packets similar to 115 except that the specific structures, lengths and/or other attributes of packets in each link may vary from application to application. (For example, some packets may not include CRC sections like 115*c* but rather may include parity check fields or other ECC means.) Under some communication protocols, the source device (e.g., 101) that originates the payload data inside packet 115 first requests access through a network pathway that includes the corresponding link (e.g., 111) as well as a subsequent pathway 112-113- . . . -114 to the destination (104), and a domain controller (not shown) must first grant that request by allocating one or more time slots on the corresponding egress link 111 for use by the source device (e.g., 101) and also must first grant that request by allocating one or more time slots on a remainder of the path 112-114 that will allow packets to reach their target destination (e.g., device 104). Once the link and/or path usages are so scheduled or otherwise granted, the source device (101) can then begin to stream a continuous sequence of packets (identified by unique sequence numbers) through the allocated network pathway (111-114); and then, when finished, the source device (e.g., 101) will typically relinquish its use of the pathway (111-114) so that other in-network devices, i.e. second originator 105, can use the relinquished network resources (e.g., 112-114) as desired. Since numerous other devices (e.g., 105) may be waiting to use various parts of the allocated network pathway 111-114, if the downstream link partner (not shown) of intermediate device 103 transmits a NAK to device 103 (or fails to timely acknowledge one or more packets sent by 103), it is desirable for device 103 to be able to respond to that replay situation as quickly as possible so as not to prolong the wait by other devices wanting to use the same network path 111-114 or parts thereof.

Several detailed aspects contribute to the determination of whether device 103 is able to respond as quickly as possible to a given replay situation (i.e., 165*b*) and whether that response does not unduly prolong the wait by other devices wanting to use parts of the same network path 111-114. Firstly, device 103 should not replay any of the already acknowledged packets 165*a*. Doing so would unnecessarily consume (and waste) what limited bandwidth is available on the downstream links 113-114 and it may confuse downstream receivers (i.e., 104) that are not expecting a second copy of an already well received packet from group 165*a*. Secondly, device 103 should be able to identify in one transaction all of the to-be-replayed packets 165*b* rather than processing each packet in group 165*b* individually because processing of individual transactions consumes more of what limited bandwidth is available on the downstream links 113-114 than that consumed by a single NAK-and-replay transaction that process the whole group of missing packets 165*b*.1-165*b*.4 all at once. Thirdly, device 103 should be able to identify within the contiguous memory space that contains missing packets 165*b*.1-165*b*.4, areas that contain nullified packets and device 103 should be able to avoid repeatedly transmitting such nullified packets (not shown, see FIG. 3D) into link 113 so as to thereby avoid wasting what limited bandwidth is available on the downstream links 113-114 and to also thereby avoid confusing downstream receivers (i.e., 104) that are not supposed to receive and process nullified packets.

The present disclosure will be focusing on how to achieve the third of the above mentioned goals, namely, avoiding the undesirable repeated transmission of certain kinds of nullified packets out over the egress side links (e.g., 113). The above-cited and here-incorporated U.S. patent application Ser. No. 11/774,457 (Integrated Memory for Storing Egressing Packet Data, Replay data and To-be Egressed Data) discusses how to avoid or cut short the transmission of certain kinds of naturally-nullified packets whose tails fail an ingress side error check. Included among those cut short the transmissions are those involving something called an early-terminated cutting through packet. The present disclosure however, will be focusing on a different kind of nullification; a late nullification of packets that have passed the ingress side error checking process but nonetheless are later nullified for other causes (i.e., soft error in the storage of bits within the replay buffer 165 or nullifications generated by the local core processor, i.e., 190 of FIG. 1B).

Still referring to details of packet structure 115 in FIG. 1A, when the PCI-Express™ version 1.0 protocol is used, the header section 115*a* of packet 115 has some unique attributes among which is the use of different types of data exchanges. Among the different exchange types there are DLL packets (DLLP's) which provide communication between so-called DL layers of link partners (e.g., 102-103, see also FIG. 1B) and there are TL packets (TLP's) which provide communication between the TL layers of link partners (e.g., 102-103). This aspect is summarized in box 115*e* of FIG. 1A. TLP's may come under different types such as those belonging to non-posted split transactions and posted transactions. The split transactions usually involve two types of TL packets: a completion TL packet (CP) and a companion non-posted TL packet (NP). The posted transaction uses a third type of TL packet identified, appropriately, as the posted transaction packet (PT). DLLP's also come in different flavors. One such DLLP flavor in the PCI-Express realm is known as a NAK DLLP and it indicates a negative acknowledgement sent at the data link layer level from the receiving link partner (e.g., due to a bad error check result at the ingress side of data receiver, i.e., 103) where the NAK DLLP is sent to its transmitting link partner (i.e., 102). Another PCI-Express DLL packet type is the ACK DLLP which indicates a positive receipt acknowledgement from the downstream link partner (i.e., 103) to the upstream one (i.e., 102). Such a positive receipt acknowledgement lets the upstream sender know that the sender can safely remove the corresponding backup packet copy from its replay buffer. Packet type or flavor designations may be specified in the header section 115*a* of the PCI-Express packet or elsewhere in the packet. Often, the header 115*a* will identify a destination for the packet 115 (i.e., device 140; and optionally—although not true in PCI-Express 1.0—a time stamp for indicating how aged the packet may be due to it waiting for a domain controller to grant it a passageway i.e. 111-114 through the network). Additionally, as already mentioned, a portion of the packet 115 will usually contain code representing a unique sequence number (see 223*b*-223*c* of FIG. 2) placed there by the data link layer of the upstream link partner for indicating where in a particular stream of packets the particular packet belongs. The sequence number data may be used to reorder payload or message segments if their corresponding packets arrive out of order at a given destination. This can happen for example, if packet number 3 arrives after packet number 10 because packet number 3 had to be resent.

Referring now to FIG. 1B, some internal details of intermediate device 102 are shown. It is to be understood that although device 102 is shown in such greater detail as constituting a multiported packet routing device and as being used for implementing an in-network routing unit, the device 102 alternatively could have been a single or two ported one. An example of a one ported device is an end-point data originating device (e.g., a data storage unit) that includes a replay buffer at its egress side. An example of a two ported device is a packet translating unit that implements a packet translating function without re-routing of packets when packets cross over from a first network domain having a first packet structuring protocol to a second domain with a respective and different second packet structuring protocol. If it is unidirectional in operation, the two ported device would generally have two replay buffers, one for each data egress pipe that forwards egressing packets into a respective one of the two domains.

In the illustration, a multiplexed first serial physical link such as 111' couples the first device 101 (Data Originator) to a physical layer interface 130 of the second device 102. (The schematically illustrated, serial link 111' is merely conceptual and may be implemented by use of plural serial links, i.e., plural twisted wire couplings, rather than just one line. It may include use of optical media as well as electrical media.) Multiple channels of data may be transmitted over the first multiplexed serial physical link 111 by use of one or more forms of signal multiplexing. Time domain multiplexing (TDM) may be used for example, on the physical serial link 111 for mixing together the data of a number of sub-channels or "lanes" of data as they are called in PCI-Express so as to define an aggregated logical channel of data flowing into a corresponding logical "port" or PCI-Express logical "link" 170 formed in second device 102.

In the illustrated example, system configuration operations have created an aggregation of four lanes numbered 0-3 for PCI port 170, with each lane effectively constituting a one byte (1-B) wide parallel lane after SERDES operations are performed in the physical layer. The physical layer interface portion 130 (PHY) of port 170 (which port is also identified as PORT_0) receives the serially transmitted signals of multiplexed link 111' (e.g., a differential and optically encoded signal; i.e., 10 bits per character optical encoding) and converts the received, serial data into four parallel data flows of 8 bit encoded data that combine and flow into a respective Port-0 Data Link layer 140 in step with a corresponding lane synchronizing clock (not shown, see FIG. 2). After processing by the Data Link layer 140, remaining packet bytes are next processed by the transaction layer (TL0) 150 of that Port_0 (170) and subsequently remaining packet bytes are thereafter processed by a core payload processor 190 (sometimes referred to as the File Data Layer Processor). In one embodiment, the core payload processor 190 includes a switch fabric that provides port-to-port routing of payload data. Egressing payload data then passes out through a routing-selected, egress port_N (17N) and through its respective TL, DL and PHY layers in the recited order prior to continuing on serial link 11N to the destination device 103.

The present disclosure will be focusing on so-called retry buffers, RB0-RB(N) in the respective m-lane ports (where m can be a different integer such as 1, 2, 4, 8, 16 for each of the reconfigurable ports). Although PCI-Express version 1.0 is used as an example here, similar retry or replay buffer structures may be employed in other packet processing systems and similar techniques for managing the replay buffer structures may be employed if practical in cases where packets are filled with unique sequence numbers and the resend request (e.g., DL-NAK) includes at least part of the sequence number of the first packet that is to be resent from the retry buffer.

Before continuing with further details of FIG. 1B, some background on PCI-Express may be in order at this point, particularly as it applies to port management. The more standard, PCI bus is a well known form of standardized signal interchange within the field of digital computer and communication system design. One lesser known extension of the PCI bus standard is referred to as PCI-X. An emerging, but perhaps not as yet, well known extension of these is referred to as PCI-Express. The three should not be confused with one another. While the present disclosure focuses on a first generation of the PCI-Express protocol, designs of second and third generation, PCI-Express protocols 2.0 and 3.0 are in development and it is expected that the present disclosure will also be applicable to PCI-Express 2.0 and 3.0 as well as to later generations.

PCI-Express 1.0 may be characterized by its use of high speed serial links and of packets structured to move through such high speed serial links. Like other communication standards, the PCI-Express protocol has a layered architecture that includes (1) a Physical signaling layer, (2) a Data link layer and (3) a Transaction layer. The Physical signaling layer of PCI-Express is typically characterized by use of a Low-Voltage Differential Signaling (LVDS) high-speed serial interface specified for 2.5 GHz or higher signaling per lane, while further using 8B/10B or like link encoding and using AC-coupled differential signaling. A complementary set of LVDS pairs is sometimes referred to as a physical link. The PCI-Express standard allows for re-configurable lane combinations within each port so as to thereby form different numbers of wider (faster) or narrower (slower) communication ports designated as ×1, ×2, ×4 and so on up to ×32; where the ×1 configuration of a given port is the slowest (narrowest) and the ×32 configuration is the fastest (widest). Multi-lane links can provide for higher bandwidth communication capabilities than can a comparable single-width link that has long dead times. The Data link layer of the PCI-Express protocol is typically characterized by packet exchange standards that govern how packets route between neighboring PCI-Express entities and over its single or multi-lane highways while assuring data integrity and providing for sequence checking, along with packet acknowledgments and flow control. The Transaction layer of the PCI-Express protocol is typically characterized by standardized rules for translating data read and/or write requests as they move through switching nodes between an intelligent host and one or more endpoint devices. Design of the File Data processing layer is left to the end user's discretion.

It is to be noted that PCI-Express 1.0™ which typically operates at 2.5 Gb/s per lane has recently been augmented with a newer, faster but backwardly compatible version 2.0 which typically operates at 5.0 Gb/s per lane and that yet a newer, faster version 3.0 of PCI-Express is in the works with expected speeds of 8 GigaTransfers per second per lane. Different varieties of a replay buffer disclosed herein may be appropriate in the different versions of PCI-Express, including the not-yet-finalized version 3.0. The present disclosure assumes PCI-Express 1.0™ for purpose of illustration.

There is much to the PCI-Express standards that are beyond the scope of the present disclosure. More information about the standard may be obtained via the internet from the PCI Special Interest Group, for example at: www.pcisig.com/specifications.

Returning now to the specifics of FIG. 1B, in this example, TL processed data words (e.g., bytes) may be temporarily stored in respective file data storage units or data stacks (not shown) within the core processor 190. In one embodiment, ingress-directed data (163.0-163.*n*) from the transaction layer sections 150-15N feeds into an ingress multiplexer (not shown). An ingress arbiter (not shown) determines when and which data will flow into a switch fabric (not shown) inside the core processor 190. After processing in the core payload processing unit 190, post-process data moves out over an egress data distribution means (e.g., a 16-Byte wide tristate bus not shown) and selectively latches into respective egress data capturing registers at receiving ends of the TL units 150-15N. Egressing post-process data then moves from its respective transaction layer unit (150-15N) to the corresponding data link layer unit (140-14N); after which the data is passed into the physical layer unit 130-13N for serialization and output via a respective destination link as the illustrated 11N. At the same time that the DL block (e.g., 14N) attaches its data-link control bytes to the passing through packets of information and as it forwards the so re-packaged packet data to the physical layer (e.g., 13N), it typically also stores the re-packaged packet data in a corresponding retry buffer area of memory (e.g., RB(N) 165.*n*) for temporary storage therein in as a resendable copy of the egressing packet. If a resend request is received (e.g., a negative acknowledge at the DL level from the link partner 103), the corresponding resendable copy in the retry buffer may be used to resend the requested packet. The resendable copy is fetched from the retry buffer area and passed into the physical layer (e.g., 13N) for repeated transmission to the device (e.g., link partner 103) that made the resend request (or failed to provide a timely acknowledgement). In one particular embodiment, as detailed in the above-cited and here-incorporated U.S. patent application Ser. No. 11/774,457 (Integrated Memory for Storing Egressing Packet Data, Replay data and To-be Egressed Data), the retry or replay buffer area is integrated into a circular buffer structure that also includes a high-speed data receiving section and a free-space interposed between the replay buffer area and the high-speed or "raceway" data receiving section. The present disclosure, though is not limited to such an integrated memory structure and the methods provided herein for skipping nullified packets during mass replay from a replay buffer area may be practiced with other forms of replay buffers.

When large streams of packets are sent, it happens every so often that the destination device 103 does not receive one or more of its expected packets or receives it in corrupted form (e.g., bad CRC error check) this being due to one or more types of temporary disruptions (118 of FIG. 1A) that may affect the corresponding egress side link (e.g., 11N of FIG. 1B). In response to a corrupted receipt; the destination device 103 sends a resend request (e.g., a NAK-DLLP packet) back through the data providing link 11N to the packet outputting device 102. Since the packet outputting device 102 keeps backup copies in the corresponding retry buffer (i.e., 165.*n*) of the packets it recently sent, as already explained, the outputting device 102 does not need to tax its core processor 190 with locating and reprocessing of pre-process data. The present disclosure focuses on methods for responding to resend requests (e.g., NAK-DLLP's), and more particularly on methods for locating the correct data in the responding retry buffers and for avoiding the inclusion of nullified packet data when replaying a batch of not-yet-acknowledged packets.

For purpose of completeness, FIG. 1B shows one of plural retry buffer controllers, 177. This controller 177 is used for determining, among other things when a negative acknowledgement (NAK-DLLP) is received and when retry data is to be responsively resent out through a respective link (e.g., 11N). Aggregation of lanes to form the various ports is controlled by a ports configuration controller 179. The latter unit determines, among other things, which retry buffer belongs to which port and what the configured capacity of the buffer should be in view of the variable number of lanes assigned to the port. It is to be noted that FIG. 1B shows a sequence number generator 175 operatively coupled to data link layer 14N (DLn) by way of connection 174. The sequence number generator 175 is also operatively coupled by way of connection 178 to the retry buffer controller 177, where the latter controls operations of the port N replay buffer, 165.*n*.

With regard to generator 175, one of the functions that a PCI-Express data link layer unit (e.g., DL unit 14N) typically performs is that of attaching unique sequence number bytes to egressing packet data passing through. FIG. 1B therefore shows the Port-N sequence number generator 175 as being coupled to DL unit 14N by way of connection 174. Normally, the sequence number generator 175 will keep sequencing through consecutive numbers so that every number in a long string of numbers is unique relative to that run. The sequence number generator 175 may rollover every so often when it hits its upper count limit. Its count may also be reset if the corresponding port is reset. Thus the sequence of numbers produced by the generator 175 is generally an unbroken one except for example when an unusual event happens such as the generator 175 being reset by a port reset command. As will be seen below when FIG. 3 is discussed in detail, connection 178, between generator 175 and RB controller 177 can be used in accordance with the present disclosure to control how retry data is found and fetched for read out from the retry buffer 165.*n* during a packets replay operation.

Figure 2:
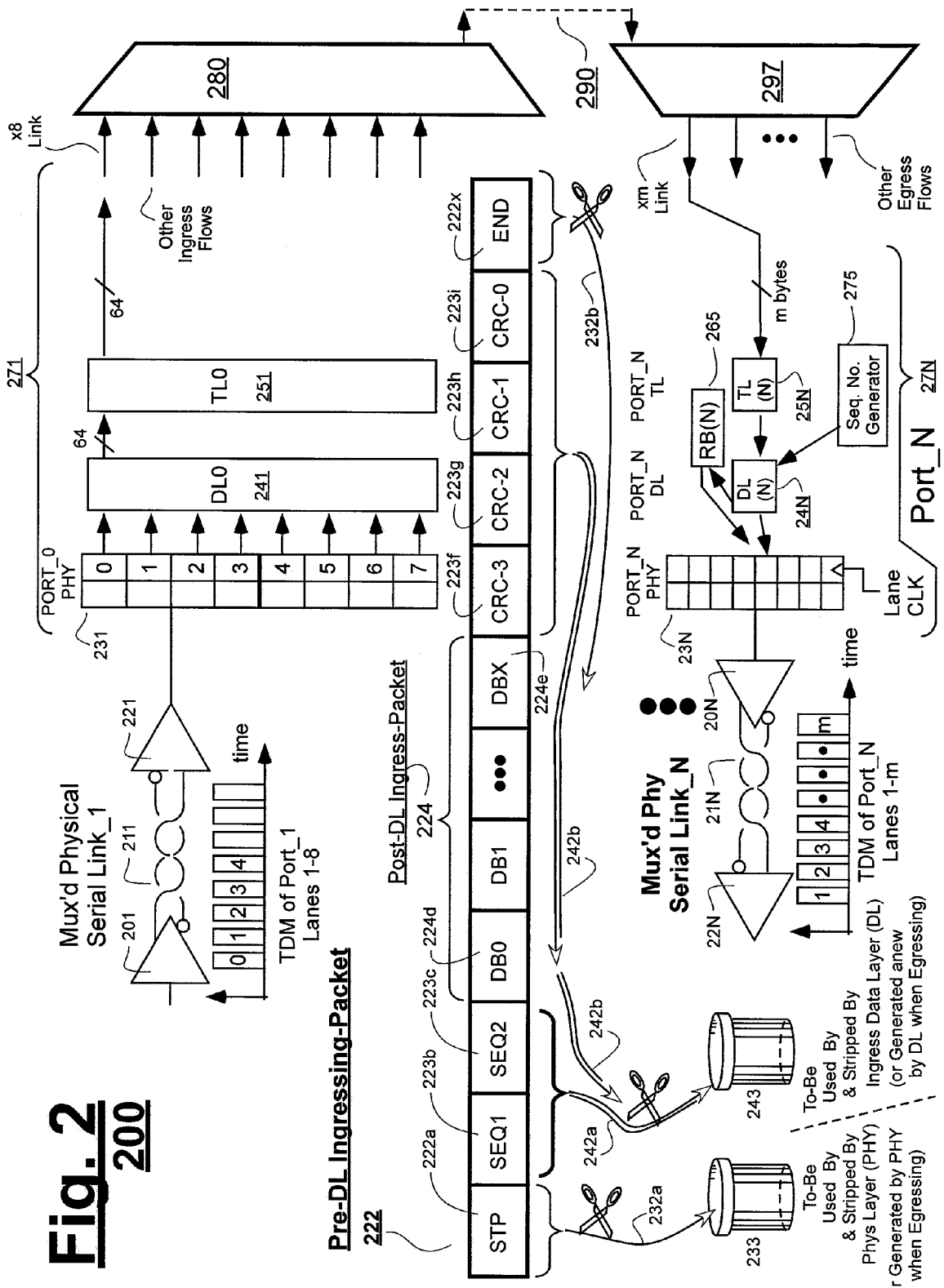
FIG. 2 is a schematic diagram showing the structure of a PCI-Express packet that contains a relatively unique sequence number associated with its payload's logical position within a sequence of payloads being delivered to a destination device.

Referring to FIG. 2, the conventional PCI-Express version 1.0 packet has its sequence number located in a pre-defined front end position 223*b*-223*c* of the packet stream as is shown in the figure. The conventional sequence number is placed across two bytes, SEQ1 and SEQ2; but in one embodiment it occupies only the least significant 12 bits of those two bytes. For sake of a more complete description of the conventional PCI-Express packet 222, FIG. 2 shows the packet structure as an ingressing one that is in its post-SERDES but pre-DL format where the packet has been converted from a serial 10-bits per character, optical encoding form into 8-bits per character form but the packet is not yet stripped of physical layer code characters STP and END. Accordingly, the illustrated pre-DL ingressing packet 222 contains the following sequence of successive bytes when implemented according to the PCI-Express protocol: First, a start-of-packet (STP) synchronizing character 222*a*—one that has been converted from a unique optically-encoded serial format (e.g., a 10 bit optical format) that indicates start of packet into a corresponding parallel data format (e.g., 8 bits per character format). Following the STP character are: the two sequence number bytes 223*b*-223*c* intended for processing by the DL layer during ingress, and then a lead data byte (DB0) 224*d* intended for processing by the TL layer during ingress. This is followed by next successive data bytes (DB1-DBx) also targeted for processing by the ingress-side TL layer and/or by a deeper core 280-290-297 of the multi-port device 231-23N. Immediately after the last payload byte (DBx) 224*e*, there is provided a succession of four cyclical redundancy check bytes (CRC3-CRC0) at positions 223*f*-223*i* where these intended for processing by the ingress-side DL layer during ingress, and finally an end-of-packet (END) synchronizing character 222*x* whose optically-encoded counterpart is intended for use by the physical layer (PL). Like the STP character, the END character was originally in optically-encoded serial format (e.g., 10 bit format) where it could be uniquely distinguished from other serialized packet characters for locating the end of the not-yet-stripped packet structure 222 and thereafter the END character has been converted into parallel data format (e.g., 8 bits per character format) where it may no longer be uniquely distinguishable from other 8 bit encoded characters. The physical interface layer (PL) can, however, keep track of the location of the STP and/or END characters in memory as they progress through the PL layer and towards the data link layer (DL), and thus the system can keep track of where the CRC bytes and sequence number bytes are and where the payload data bytes are as the packet progresses from PHY layer to DL layer and then to the TL layer (e.g., 251) in the ingress side of the device.

Scissor symbols 232a, 232b are employed in FIG. 2 in combination with a first trash can symbol 233 for schematically representing a usually desired first strip-off and utilize action to be applied during ingress to the STP byte 222a and to the END byte 222x by circuitry of the physical interface layer (PL). The packet receiving Phys Layer 231 uses the STP and END symbols in their optically-encoded form for delineating the start and end of the embraced, other bytes 223b through 223i in each ingressing data packet 222. FIG. 2 further schematically shows the usually desired use and strip-off of the SEQ1, SEQ2 bytes 223b-223c and the CRC bytes 223f-223i by the data link layer (DL) during ingress where this use is represented by means of scissor symbols 242a, 242b and the second trash can symbol 243. The remaining, post-DL packet bytes 224 are then re-aligned for use by the transaction layer (TL) column 251 into the form of a TLP (transaction layer packet) so that the TL0 layer can properly process the remaining data bytes 224. Despite the usually desired, strip off of bytes 222a, 223b, 223c and 223f-223i and 222x; in one embodiment the 8 bit ingress versions of these are retained in replay buffer 265 and special tracking flags are used to locate the storage positions of the SOF and EOF bytes (222a and 222x) as shall be detailed below.

In one embodiment, after TL processing occurs (where the TL processing may include further strip off of shell bytes), the TL processed data words (e.g., bytes) may be temporarily stored in respective FIFO's which could be inserted in unit 280 of the drawing. Units 280, 290 and 297 may be seen as constituting a switch fabric where unit 280 operates as a multiplexer, unit 297 operates as a demultiplexer and unit 290 channels data from the output of 280 to the input of 297. The ingress side FIFO buffers (not shown) may then feed their ingressed and stripped data (stripped to the file layer level) to the post-TL processing core 290-297. In one embodiment, the packet processing device 200 operates as a multiported packet switching device.

For purpose of further illustration, FIG. 2 shows in this embodiment that the ingress port (Port-0) is configured as a by-8 lane aggregation and that the first serial physical link 211 includes a high frequency source amplifier 201 coupling via twisted wire pair to a corresponding receiving amplifier 221, where the latter amplifier 221 is inside IC device 200 (monolithic integrated circuit). Multiple channels of data may be transmitted over the first multiplexed serial physical link 211 by use of one or more forms of signal multiplexing. Time domain multiplexing (TDM) may be used for example, on the physical serial link 211 for mixing together the data of a number of lanes or sub-channels. In the example of multiplexed serial physical link 211 and its corresponding, first ingress port 271, system configuration operations have created an aggregation of eight lanes numbered 0-7, with each post-SERDES lane effectively constituting a one byte (1-B) wide parallel lane. Post-TL payload data passes through core processing units 280, 290 and 297 for subsequent output by way of egress port 27N (Port_N). The Port_0 retry buffers are not shown in this diagram in order to avoid illustrative clutter.

Rather than ingressing via Port_0, one TLP (a Post-DL packet data 224) may have ingressed via Port_N (port 27N) and may include a resend request (e.g., a NAK-DLLP message) that instructs the same port 27N to resend a particular packet back out again through serial link 21N because a first sending and receive attempt for that to-be-resent packet failed. In one embodiment, the resend request (inside field 224, not explicitly shown) contains part or all of the sequence number of the already-buffered and to-be-resent packet (not the same packet as the ingressed TLP packet carrying the resend message inside its field 224). Contents of the to-be-resent packet are stored in one or more retry buffer units such as 265 (RB(N)) of FIG. 2. That to-be-resent packet (whose payload is stored inside 265) will contain a unique sequence number that was earlier generated by, and will be regenerated by generator 275 at the time of resend.

Figure 3A:
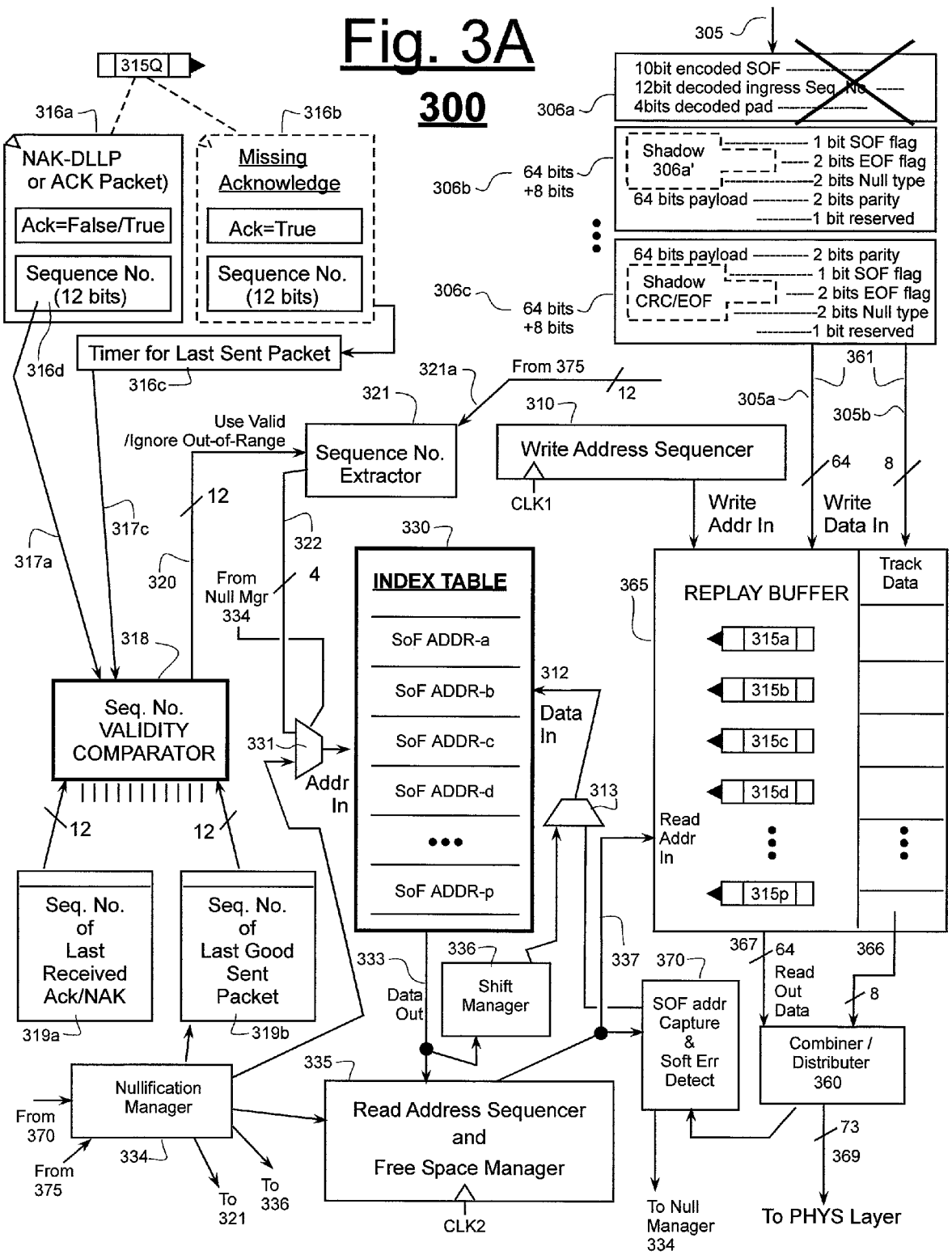
FIG. 3A is schematic diagram showing an index table coupled to a replay buffer and including means in accordance with the disclosure for bypassing nullified ones of not-yet-acknowledged packets.
Figure 3B:
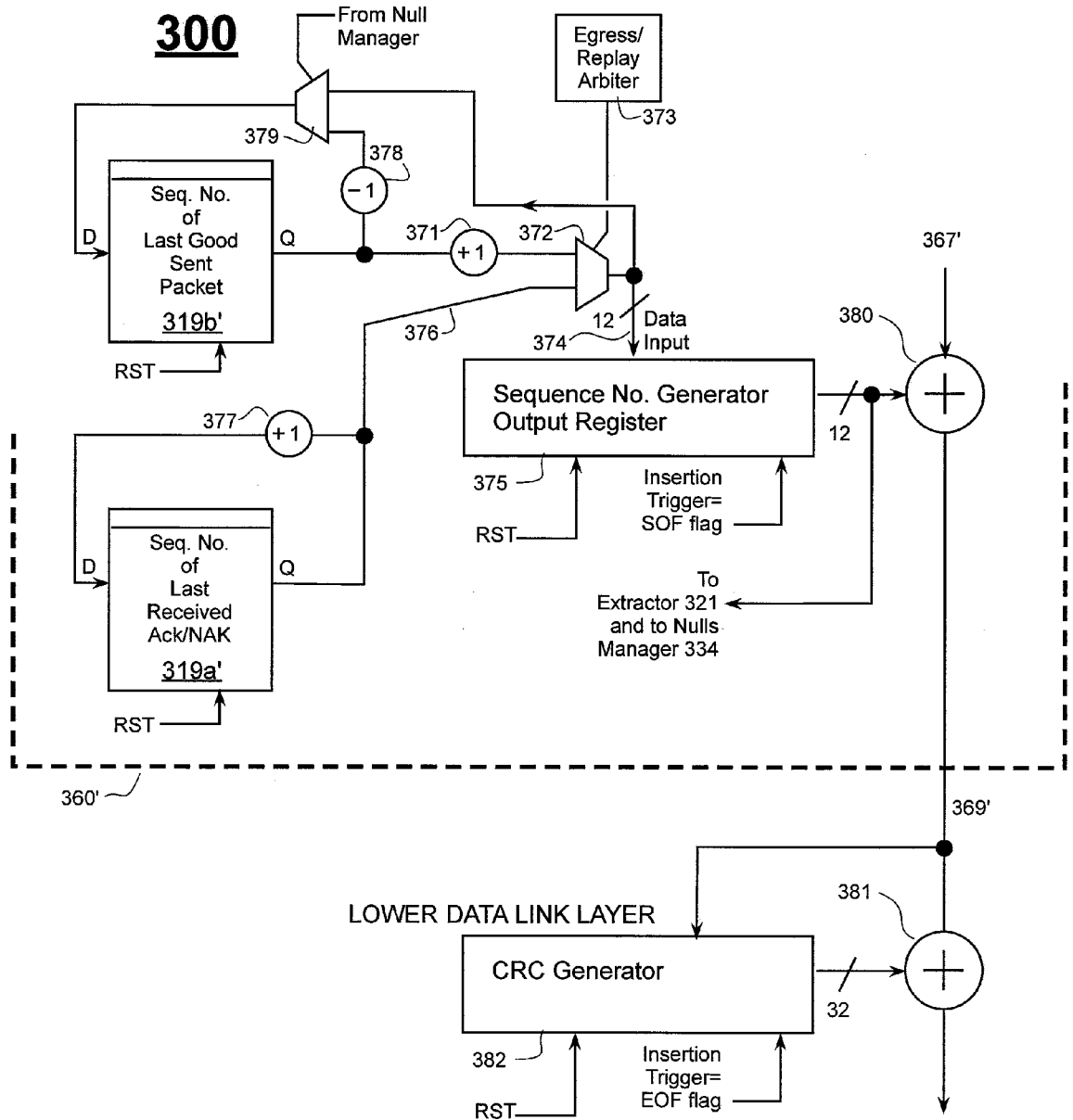
FIG. 3B is schematic diagram showing a sequence number generator.

Referring to FIG. 3A, a circuit 300 for managing the storage of, and locating and fetching of retry buffer contents in accordance with the disclosure is shown. One detailed portion inside unit 360' is shown in FIG. 3B as including a sequence number generator's output register 375. During normal operation, the output register 375 is triggered by a series of SOF presence flags to output a consecutive succession of 12 bit numbers (sequence number signals) for insertion into corresponding pre-PHY, egressing packets (see 224 of FIG. 2) by a DL insertion means 380. The sequence number generator is shown in FIG. 3B to include first and second registers 319a' and 319b'. Operational details of the sequence number generator (375) will be explained later after some overlapping functions of registers 319a' and 319b' are detailed with respect to FIG. 3A.

In the illustrated embodiment 300 of FIG. 3A, TLP data and control signals are carried on a high speed bus 305 that feeds into a data write port 361 of replay buffer structure 365. The high speed bus 305 has sub-buses 305a and 305b for respectively carrying packet data and data-tracking flags. In one embodiment, sub-buses 305a and 305b couple in parallel into memory write port 361. In one embodiment, each addressable memory location (entry location) of buffer 365 contains 72 bits where 64 of these bits constitute packet data (supplied by sub-bus 305a) and the remaining 8 bits constitute tracking flags (supplied by sub-bus 305b). The tracking flags include flags that signal the presence of a start-of-frame (SOF) payload byte (DB0 224d of FIG. 2) or the presence of an end-of-frame (EOF) payload byte (DBx 224e of FIG. 2) within the associated group of 64 bits. These SOF/EOF presence flags can be used to identify the location in memory 365 that constitutes a start or end of packet payload data. The identified address can be captured by an SOF address capturing unit 370 as shall be detailed shortly below. Control sub-bus 305b carries the tracking flags and loads then into the write port of buffer 365. In one particular embodiment, TLP payload data 305a and TLP tracking flag data 305b may be supplied on bus 305 at an average delivery rate corresponding to a device-wide maximum bandwidth. In one embodiment, the device-wide maximum bandwidth corresponds to the maximum payload bandwidth of the core processing unit (e.g., 280-290-297 of FIG. 2.) When the TLP payload data 305a enters the replay memory structure 365 for storage therein through write data receiving port 361 (in conjunction with associated tracking flags 305b), a corresponding write address is provided from a write address sequencer 310. Memory unit 365 has, or operates as though it had independent write and read clocks for its respective write-in and read-out ports, 361 and 367 wherein the write clock operates at a frequency corresponding to the device-wide maximum bandwidth and the read clock operates at a frequency corresponding to a variable bandwidth associated with its egress port so as to thereby match the egress rate of a variably configured egress pipe or port (not shown).

In one embodiment, the start of each packet is written into a corresponding memory entry location of buffer 365 as 64 bits constituted by a start-of-frame byte (e.g., DB0 224d of FIG. 2) that is aligned to the beginning of the 64 bit region (306b) and is flagged by the SOF presence flag being set true for that 64 bit region. The SOF presence flag corresponds to detection in the PHY-layer of an optically encoded 10 bit special start-of-frame indicating character. This is followed by two more characters representing a 12 bit long unique sequence number associated with the ingressing version of the packet. However, the 10 bit special start-of-frame indicating character and the ingress side sequence number characters are stripped out prior to receipt by memory unit 365 as is indicated by the X drawn though initial data region 306a. Sixty four (64) bits of decoded payload data follow the stripped away shadow data 306a' and these 64 payload bits are shown to fill a first 64 bits of a corresponding 72 bit storage location represented by box 306b. The remainder of the same 72-bit wide memory location (306b) contains the following flags: (a) a 1 bit SOF presence flag that if true indicates that the first 8 bits of the 64 bit data region 306b contains the DB0 byte (224d of FIG. 2); (b) 2 bits of EOF presence flag that if either is true indicate that the associated 64 bit data region (see 306c) contains the DBx byte (224e of FIG. 2) either at the 32 nd byte position in block 306c or at the 64th byte position depending on which of the 2 EOF-present bits is set true; (c) 2 bits of nullification flag that if either is true indicate that the corresponding packet has been nullified either naturally or due to other reasons (i.e., memory soft error); (d) 2 bits of parity for performing parity checking on the associated 64 bit data region (306b or 306c); and (e) 1 bit of control data that is reserved for possible future use. In the same embodiment, the payload data of a last 72-bit wide memory location (306c) for the given packet is to be followed by 32 bits of CRC data (cyclical redundancy checking data, see 223f-223i of FIG. 2) followed by a special 10 bit-encoded EOF character. However, this shadow CRC/EOF data is not created and appended to the payload data until later when the packet data emerges from output port 367 of the replay buffer 365 and passes through data insertion units 380 and 381 of FIG. 3B. More specifically, when the 72-bit wide memory words, 306a and 306b, are later read out from ports 366-367 of the buffer, a data combining and redistributing module 360 detects true ones of the SOF and EOF presence flags (output on bus 366) and then signals and SOF capture unit 370 to determine the location in buffer 365 of the corresponding SOF and EOF payload bytes (DB0 and DBx). The SOF capture unit 370 is operatively coupled to a read-address supply bus 337 that supplies to the replay buffer 365, the read address that causes the detected SOF and EOF presence flags to emerge on bus 366. Some of the determined locations become SOF address signals that are subsequently written into various storage locations of index table 330, where the functions of these indexed SOF addresses are detailed below. It is to be noted that in one embodiment, the data throughput rates at write port 361 and read ports 366-367 will generally differ from one another. In that regard, memory 365 may be viewed as a rate smoothing buffer for SOF and EOF presence flags that enter via write port 361 and whose associated addresses are later captured and forwarded from address capturing unit 370 into data input port 312 of index table 330.

An output from the data combining and redistributing module 360 couples to a lower data link layer section (see 382 of FIG. 3B) which attaches respective error check codes (see CRC bytes 223f-223i of FIG. 2) to each of the consecutively numbered pre-DL egressing packets. The resulting packet contents then continue beyond bus 369 and CRC inserter 381 for processing by a PHY-layer processor. In one embodiment, the connection 369 to the PHY-layer is a 73 bit bus; however the 73 bits are of a different format from the 72-bit blocks emerging from output buses 367 and 366 of replay buffer 365.

As mentioned, in one embodiment replay buffer 365 is structured in accordance with the above-cited and here-incorporated U.S. patent application Ser. No. 11/774,457 (Integrated Memory for Storing Egressing Packet Data, Replay data and To-be Egressed Data). However other structurings for the replay buffer may be used while comporting with the present disclosure. For example, in an alternate embodiment, rather than being just written into replay buffer 365, packet data that is to be played-out for the first time onto a corresponding egress line (e.g., 113 of FIG. 1A) may bypass buffer 365 for direct output on line 367 and coupling thereafter to the physical layer while the same data is simultaneously copied into replay buffer 365. In one PCI-Express embodiment (versions 1.0 and 2.0), the physical layer (not shown) converts the multiplexer output 369 into optically encoded form (8B/10B) and attaches start of packet (STP 222a) and end of packet (END 222x) delimiting codes to the extreme ends of the packet data. The result is then serialized and output to the link partner via the corresponding serial link (i.e., PCI-Express lane(s)). In another PCI-Express embodiment (version 3.0) other types of encoding and link equalizing techniques may be used. (At the time of this writing, the detailed specifications for PCI-Express 3.0 had not yet been finalized.)

In one embodiment, the sequence number generator's output register 375 (FIG. 3B) couples to a sequence number extractor 321 FIG. 3A) by way of line 321a so that extractor 321 can extract sequence number data from the signals moving out along bus 369 towards the PHY layer. Replay buffer 365 retains copies, 315a, 315b, . . . , 315p of the packets output along bus 369 towards the PHY layer. During first-time playout of these packets 315a, . . . , 315p; a 12-bit portion 321a of sequence number signals passing over bus 369 eventually find their way into sequence number extractor 321 and a least significant four of these bits pass by way of multiplexer 331 into the address input of index table 330 while corresponding start-of-frame (SOF) addresses (as captured by SOF address capturing unit 370) are being filled into index table 330 during an initial build of table 330.

In one embodiment, RB 365 can store copies of as many as the last 16 TLP-directed packets that have been once played-out via the physical layer and have thus been transmitted to a downstream link partner but not yet acknowledged by the link partner. (The actual number of replayable packets stored in RB 365 may depend on the finite storage capacity of the RB 365 and on the lengths of the packets 315a-315p intended to be stored therein. If the packets are very long, then it may not be possible to store the maximum predetermined number of 16 of such resendable packets.) In response to receipt of the currently egressing packet's sequence number on line 321a, the sequence number extractor 321 extracts the least significant four bits of the 12 bit sequence number signal 321a and outputs these LSB's as an index number signal applied via multiplexer 331 to the address input port of index table 330. Those skilled in the art will appreciate that the output of multiplexer 331 (and extractor 321) will be expanded to output 5 LSB's if, for example, RB 365 is designed to store as many as the last 32 sent packets, or reduced to output just 3 LSB's if RB 365 is designed to store no more than the last 8 sent packets.

A write address sequencer 310 generates the start and further addresses at which the 72 bit data entries for each resendable packet (315a-315p) are stored in the RB 365. Although the coupling is not shown, in one embodiment, write address sequencer 310 is responsive to a free space manager circuit within unit 335. The free space manager 335 indicates to the write address sequencer 310 where sufficient free space exists within RB 365 for storing the contents (i.e., 315a) of each next-to-be-stored, later to be once played-out, and resendable packet. The output bus of the write address sequencer 310 couples to the write address input port of RB 365. The address signal output by write address sequencer 310 is later discovered by SOF address capturing unit 370 when read address sequencer 335 outputs the same address and the corresponding SOF presence flag on bus 366 is detected as being set true. During reading of data via ports 366 and 367, the start-of-frame address value captured by unit 370 is forwarded via multiplexer 313 and data input bus 312 for recording into a corresponding slot of the index table 330 as identified by the index signal output onto bus 322 (e.g., the 4 LSB's of the sequence number) by extractor 321. It is within the contemplation of the disclosure to use other forms of locaters in index table 330 besides storing the SOF address directly into index table 330. For example, indirect pointers may be instead stored in index table 330.

It is seen from the above that a retry packet storing method in accordance with the present disclosure may comprise: (a) storing the packet payload contents (i.e., 315a) of a to-be-egressed packet in a retry buffer (365) starting at a start address assigned to the packet by storage control unit (310); (b) extracting a less significant part (e.g., 4 LSB's) of a sequence number (321a) of egressing packet data whose copy is stored in the retry buffer (365) and from the sequence number, generating an index (322) pointing into an entry location of an index table (330); and (c) recording the start address (or other locater) for the egressing packet in the index table according to the generated index (322). (In one embodiment, the end address of the stored packet payload is also recorded in the same or a secondary index table using the same generated index (322) as part of, or the whole of, the write address applied to the index table(s)). However, this is not necessary for appending the CRC bytes because, as seen in FIG. 3B, the CRC insertion process is triggered by detection of one of the EOF presence flags being true on bus 366.

After the original egressing packet is sent out via line 369 and via the physical layer to the downstream link partner (e.g., 103 of FIG. 1), it is expected that the link partner will send back an acknowledgement packet 315Q (FIG. 3A) to the sender within a predefined time limit established by a timer 316c. There are at least 3 possibilities: (a) the link partner sends back a positive acknowledgement (Ack=True in box 316a) indicating good receipt; (b) the link partner sends a negative acknowledgement (e.g., a NAK DLLP packet) indicating failure of error check at the data link level (Ack=False in box 316a and/or Type=NAK DLLP); and (c) no acknowledgement indication comes back as is indicated by phantom representation 316b and the timer counts past its programmed limit value.

Consider first the case (b) where the link partner (e.g., 103) sends back a NAK DLLP indication (Ack=False) 316a. The NAK DLLP signal includes a field 316d containing the sequence number of the earlier sent, payload-carrying packet that failed error checking in the DL layer of the downstream, receiving link partner (e.g., 103). Line 317a carries that sequence number signal to a validator 318. In one embodiment, sequence numbers of NAK DLLP's or ACK DLLP's are deemed valid if they fall in a range defined by the sequence number in field 316d of the last received Ack or NAK and the sequence number (obtained from line 381a) of the last sent, packet, inclusively. Register 319a (which register is the same as 319a' shown in FIG. 3B) stores the sequence number of the last received Ack or NAK. Register 319b (which register is the same as 319b' shown in FIG. 3B) stores the sequence number of the last sent packet that had good parity (no detectable soft error). Registers 319a and 319b couple to validator 318. If the NAK DLLP sequence number of line 317a falls in the valid range, it is supplied via line 320 to the extractor 321 and the corresponding 4 LSB's are output on line 322 for application to the index table via multiplexer 331. If the NAK DLLP sequence number of line 317a falls outside the valid range, it is ignored and the index table does not output a corresponding fetch address. On the other hand, if the system 300 receives a NAK DLLP indication with a valid sequence number, the index table 330 responsively outputs the starting or fetch-begin address for the corresponding and to-be-resent packet on data-out line 333. The read address sequencer and free space management unit 335 initiates to the fetch-begin address and supplies a corresponding consecutive sequence of read addresses over line 337 to the read address input port of RB 365. At the same time, in FIG. 3B the sequence number on line 376 is loaded into register 375. The retry buffer 365 then outputs the corresponding packet data via line 367 and through data distributor 360 for output on bus 369 and processing by the downstream physical layer. The sequence number inserter 380 inserts the output sequence number in response to triggering by the SOF presence flag. The CRC inserter 381 inserts the generated CRC bytes in response to triggering by the EOF presence flag. The NA[c] Ked packet is thereby resent to the downstream link partner.

It is seen from the above that a retry packet locating and fetching method in accordance with the present disclosure may comprise: (a) using at least part of a sequence number (316d, 320) of a packet to be fetched from a retry buffer for generating an index (322) into an index table; (b) obtaining a fetch address (333) or other locater for the to-be-fetched packet from the index table according to the generated index; and (c) fetching the packet (367) from the retry buffer according to the fetch address (or other locater) obtained from the index table. In one embodiment, the end address (EOF address) of the to-be-fetched packet is also obtained by use of the generated index (322) as applied to the same index table or to a secondary index table (not shown).

Consider next the case (c) where the downstream link partner (e.g., 103) does not send back either a NAK DLLP or an ACK DLLP (Ack=True in 316a) and the timer 316c flags a time limit error via line 317c. In response, it is assumed that all last-sent packets in the range defined by the sequence number plus one of register 319a through that defined by the sequence number in register 319b need to be resent. The validator 318 fetches the sequence number of the last sent packet that was acknowledged from register 319a, increments it by one and applies the incremented value via line 320 to the extractor 321. The 4 LSB index signal is consequently applied via line 322 to the index table and the fetch-begin address (or other locater) for the corresponding first of a group of resendable packets is generated on data-out line 333 of the index table. The read address sequencer and free space management unit 335 initiates to that fetch-begin address and supplies a corresponding consecutive sequence of read addresses over line 337 to the read address input port of RB 365. At the same time, in FIG. 3B the incremented sequence number on line 376 (incremented by the +1 unit 377) is loaded into register 375. The retry buffer 365 then outputs the corresponding packet data via line 367 and through distributor 360 for processing by the downstream physical layer. The sequence number inserter 380 inserts the output sequence number of each replayed packet in response to triggering by the corresponding SOF presence flag. The CRC inserter 381 inserts the correspondingly generated CRC bytes for each replayed packet in response to triggering by the corresponding EOF presence flag. The process stops after the packet pointed to by the pointer in register 319b has been processed. All the once-played-out-but-not-yet-acknowledged packets are thereby resent to the downstream link partner.

Consider next the case (a) where the link partner (e.g., 103) sends back an ACK DLLP (Ack=True in 316a). In this case, the link partner successfully received the corresponding payload or message-carrying packet and it is desirable to free up the space of the corresponding backup copy from the RB 365. Line 317a carries that sequence number signal from field 316d of the ACK packet to the validator 318. If valid, the sequence number signal from field 316d continues via line 320 into the extractor 321. In response to an ACK indication and a valid sequence number in field 316d, the validated contents of field 316d are loaded into register 319a. Additionally, the read address sequencer and free-space management unit 335 gets the SOF address of the next once-played-out-but-not-yet-acknowledged packet, subtracts one from that address and designates the result as a new end of free space within the replay buffer. New packet content (361) can be written into the free space created by the free space allocation operation.

It is seen from the above that a retry buffer managing system 300 is disclosed which uses a less significant subset of the sequence number for responding to NAK's, to ACK's or to timer error flags for obtaining the fetch begin address (or other locater) of the corresponding packet contents (e.g., 315a-315p) in the retry buffer 365. However, there is another set of error events that can happen. While a not-yet-played-out packet (e.g., 315d) sits in buffer 365 waiting to be played out for a first time, the data in the packet may be subject to an unrepairable soft error (e.g., due to radiation emission). The soft error is not detected until actual playout, at which time a parity error detector (inside 370) detects the error condition. The first-time playout continues as is. However it is desirable to avoid further playouts of the same packet data now that it is known the packet is infected with a soft error. This can be done, as explained below, simply by not updating an end-of-table pointer, 319b. Moreover, while an already-once-played-out packet (e.g., 315c) sits in buffer 365 waiting to be acknowledged, the data of that already-once-played packet may be subject to an unrepairable soft error (e.g., due to radiation emission) as it waits for the acknowledge even if the already-once-played-out packet (e.g., 315c) did not show a soft error during its first playout. These events are referred to here as late stage nullification errors.

If a late stage nullification error occurs, it is desirable to avoid replaying a so-nullified packet, especially when the egress pipe is a slow one. Replaying a late stage nullified packet through a low bandwidth egress pipe wastes what little bandwidth is available through that pipe. The present disclosure provides a method for avoiding the replay of late stage nullified packets.

Referring again to FIG. 3A, the SOF address capturing unit 370 includes a first time playout and later stage nullification detector. During a first time playout of a packet, the latter unit sets one of the 2 nullify flag bits coming out of bus 366 as part of each 72 bit entry if there is an early termination or a soft error detected at that time of first playout. On later playouts (replays) of a given packet, the first time playout and later stage nullification detector does not change the 2 nullify flag bits. However it still tests for correct parity so that later stage soft errors can be detected. When a late stage parity error is detected by unit 370 during a packet replay, unit 370 activates a nullifications managing unit 334 and sends the sequence number of the nullified packet to unit 334. The nullifications managing unit 334 is operatively coupled to the read address sequencer 335, to a shift manager 336 and to register 319b. In one embodiment, in response to this, the nullifications managing unit 334 increments the sequence number corresponding to the nullified packet by one and applies the LSB's via multiplexer 331 into the address input of index table 330. The nullifications managing unit 334 then commands the shift manager 336 to load (store) the SOF address output on bus 333 and to retain it. The nullifications managing unit 334 then decrements the sequence number it is applying via multiplexer 331 into the address input of index table 330 and commands the shift manager 336 to write the retained SOF address into index table 330 via multiplexer 313. In this way, the SOF address of the nullified packet is overwritten by the SOF address of the packet below it in the index table. See FIG. 3D.

If the SOF address that was just shifted upwards is not that pointed to by register 319b, then the next SOF address below is shifted upwardly in the index table. The nullifications managing unit 334 increments the sequence number it was applying via multiplexer 331 and repeats the shift-up operation as described above. This continues until the SOF address that was just shifted upwards is that pointed to by register 319b. At that stage, the value in register 319b is decremented by one and the nullification handling process is complete. See FIG. 4A for an example of one process that can be carried out by nullifications managing unit 334. See FIG. 4B for an example of an index table structure that can perform all shifts in a single clock cycle.

The operation described above for reorganizing (rebuilding) index table 330 causes the late nullified packet to be skipped over during a mass replay operation. In one embodiment, the shift operation does not need to be carried out if detection of the soft error occurs during a first time playout of a last received packet. This is so because pointer 319b is not updated until after a first time playout of a last received packet is completed and the first time played-out packet is found to be "good" in terms of its data integrity (e.g., good parity check). Thus pointer 319b points to the last sent packet that has been proven to be good. If during a first time playout of a last received packet, the packet is detected to be bad (e.g., a parity error due to a soft error in memory), the value in register 319b is not updated and the next SOF value of the next received packet will overwrite the entry in the index table for the bad packet after successful first time playout of that next packet.

Here in more detail is how an index table gets built up from scratch In one embodiment. In response to a reset of the data link layer (DL), registers 319a and 319b are loaded to both point to a predetermined entry area in the index table, for example to the entry corresponding to a sequence number with all of its LSB's set high (e.g., seqnum=12'b . . . ffff). In this state, the index table is considered to be empty. Then, when a currently transmitting payload is going out, that payload is assigned a sequence number equal to the seqnum of the last transmitted packet plus one (in other words, the seqnum value stored in register 319b+1). If the currently transmitting payload is one that is being played-out for a first time. As a new TLP packet is going out from replay buffer, the SOF address capture unit 370 will send detected the SOF address (spotted on bus 337 in conjunction with an SOF flag on bus 366) to the index table (330). The captured SOF address will be written into index table as new entry at the position pointed to by the sum of what is in register 319b plus one (last good tx'd_seqnum+1).

When the EOF of the currently being played-out packet is detected by unit 370, and it is determined that the packet is not nullified (e.g., does not contain a soft error), then value in register 319b, namely, the last good tx'd_seqnum will be incremented by 1; so that the earlier-written SOF address of just finished and now known to be good packet payload will become a valid entry in the index table. On the other hand, when the EOF of the currently being played-out packet is detected by unit 370, and it is determined that the packet is nullified (e.g., does contain a soft error), then the contents of register 319b (last good tx'd_seqnum) will not be changed and the entry location in the index table to which 319b plus 1 points and to which the SOF address of the next currently being played-out will be written does not get changed.

As mentioned, in one embodiment the index table is structured to hold no more than 16 entries (and in an alternate embodiment, 32 entries). So there is a point where the index table can become filled to capacity or close thereto. In one embodiment, an almost-full-detection flag (not shown) is set, when the currently being played-out seqnum equals to the contents of register 319a minus one (in other words, last_ack'd_seqnum−1) and the payload of the currently being played-out packet is found by unit 370 to be a good one (not nullified). When the end of a good playing-out packet is detected and this almost-full-detection flag (not shown) is set and the seqnum value stored in register 319b+1 equals the last good ack'd_seqnum stored in register 319a, then another flag (not shown), an index-table-full flag is set in response. When the latter index-table-full flag is set, then in one embodiment, no new payloads (not-yet-played-out TLP payloads) can be released from the replay buffer. In this way the system waits until the not-yet-acknowledged payloads in the replay buffer are dealt with before more payloads are released. The almost-full flag and the full flag will be unset if either one of the following conditions is met: (1) an ACK-DLLP is received for one or more already played-out packets or (2) a soft error is detected in a currently being replayed packet and as a result the free space in the index table is increased by a shift operation.

Referring to FIG. 3C, an example is shown where pointer P319a (stored in register 319a) is pointing to an index table entry denoted here as number 1 which contains the SOF address for the oldest once-played-out-but-not-yet-acknowledged of the packets (packet 315a). The actual index number of course does not have to be a "1". This is just an example. Pointer P319b (stored in register 319b) is pointing to index table entry number 4 as containing the SOF address for the most-recently once-played-out-but-not-yet-acknowledged of the proven-good packets (packet 315d). It is assumed first that packet 315c has not yet become a late nullified packet due for example to a soft error while packet 315c was stored in the replay buffer 365a up until at least the first time playout of packet 315c (which playout proved that packet 315c still had good data integrity). It is also assumed that the downstream link partner sent back a negative acknowledgement (a NAK DLLP) that per PCI protocol, contains in field 316b (FIG. 3A) the sequence number of the last well received packet 315a; meaning that the group from 315b to 315d needs to be replayed.

The reason why the link partner sends back the sequence number of the last well received packet 315a rather than the seqnum of the first badly received packet 315b is because a packet after 315a failed to get through successfully (e.g., failed a CRC check at the downstream link partner) which is why the link partner sent the NAK-DLLP (316a of FIG. 3A). It is therefore not known whether the received seqnum of packet 315b at the link partner side is correct. Accordingly, the replay controller increments the sequence number of the last well received packet 315a and then commands a packet-by-packet replay of all packets identified in the index table 330a starting with the one below pointer P319a and including the one pointed to by pointer P319b inclusively. The SOF address in index table entry number 2 is used to identify the start of storage of packet 315b in buffer 365 while the EOF presence flag that comes out of bus 366 triggers the CRC insertion operation (381 in FIG. 3B) during the replay of that packet 315b.

Then, if pointer P319b is not pointing to the last processed entry in the index table as being the end of the batch, the process repeats. In the assumed first case (315c not yet nullified) that means that packet 315c will next be automatically replayed, and then finally 315d. However, there are alternate second and third cases where packet 315c (e.g., for example) is late nullified in an interim period and it is desirable to automatically skip repeated replaying of the late nullified packet 315c.

Assume therefore that in the interim after packet 315c was first played-out and now, packet 315c is hit by a soft error while it sits within the storage of replay buffer 365. The SOF addresses capturing and error detecting unit 370 cannot know about this late incurred soft error unless and until packet 315c is replayed yet again. If packet 315c is not replayed yet again, then the afterwards acquired soft error is a don't care. On the other hand, if packet 315c is replayed (where the replay occurs after a first time playout with good data integrity having already happened for the again outgoing packet 315c), the SOF addresses capturing and error detecting unit 370 will learn of the soft error during the time of that replay. The defective packet 315c will go out to the downstream link partner (with a set EDB flag) irrespectively. However, it is undesirable to replay the defective packet 315c yet again after it has been learned that packet 315c contains an irrepairable soft error or a core-initiated nullification. This is where the skip over process comes into play.

The skip over process is illustrated in FIG. 3D. The entry that had been in index table location number 4 has been overwritten into location number 3 and pointer P319b' has been decremented to point to location number 3 rather than to the original end of batch location, number 4. As a result, free space in the index table increases and when the above described batch replay process is carried out (if called for), replay of the late nullified packet 315c will not occur and the batch replay process stops after packet 315d is replayed. Packet 315d takes on the sequence number that had been earlier assigned to the now-known-to-be defective, packet 315c.

Figure 4A:
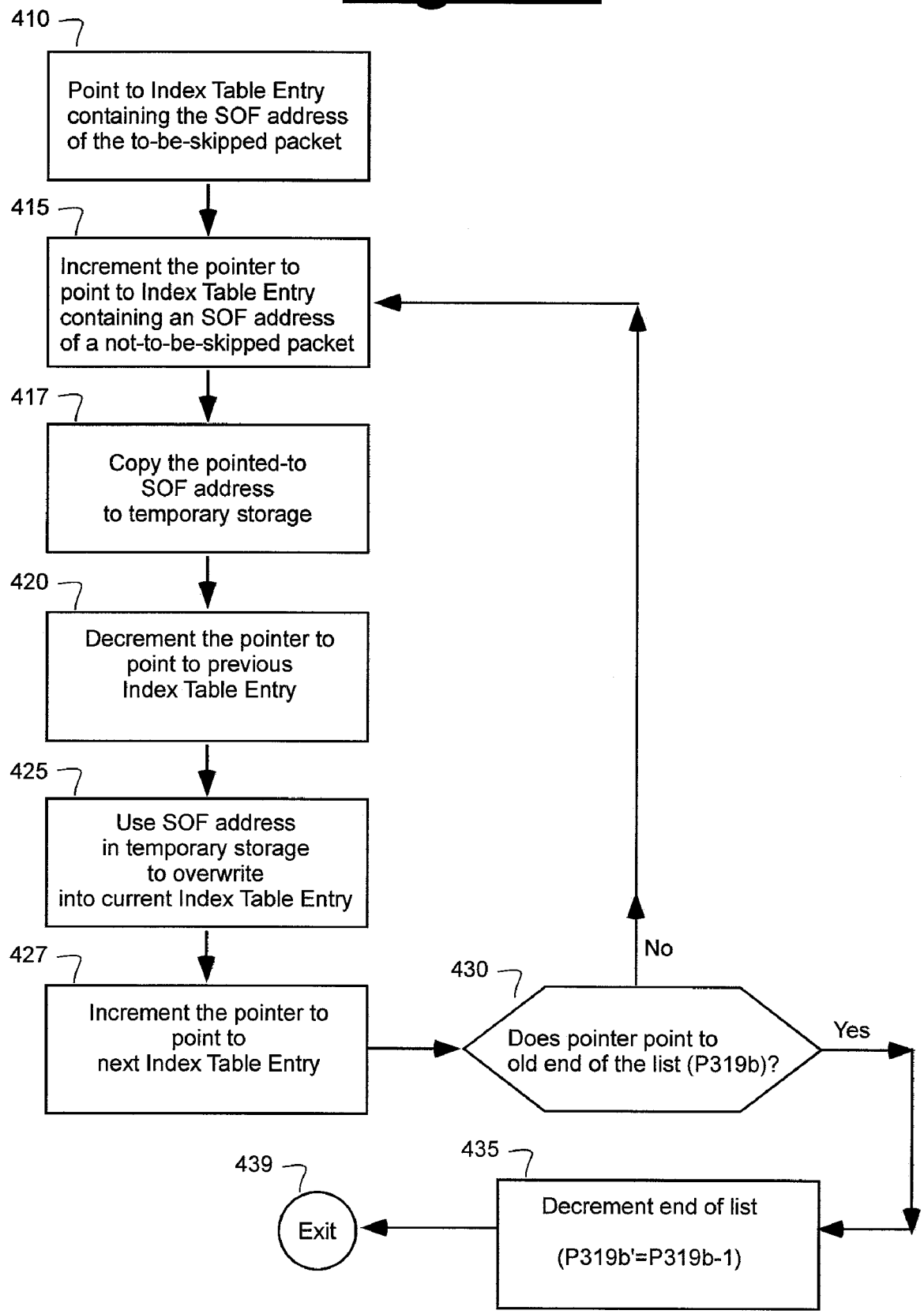
FIG. 4A is a flow chart of a method for shifting an index table.

Referring to FIG. 4A, one possible automated process for shifting data in an index table in accordance with the principles of FIG. 3D is detailed. At step 410, during a read-out from replay buffer 365 of a just nullified packet (i.e., 315c), knowledge of the nullification is obtained by unit 370 due to detection of a set nullification flag on bus 366 (FIG. 3A) and the sequence number of the late nullified packet is obtained by unit 334 from register 375 in response to the error detection by unit 370. The nullifications managing unit 334 extracts the 4 LSB's of the sequence number so as to point to thereby point to the location in the table 330 corresponding to the nullified packet (i.e., table location 3 in FIG. 3C). However, there is no need to access that location at this moment. Instead, per step 415, the pointer is incremented by one by the managing unit 334 and then applied via multiplexer 331 to the address input of index table 330 so as to point to the next table slot (i.e., table location 4 in FIG. 3C). At step 414, the contents of the pointed-to table slot are fetched and temporarily stored in the shift manager unit 336. At step 417 the pointer is decremented (or the earlier obtained same value is retrieved) so as to thereby point to the location in the table 330 corresponding to a table slot that is now to be overwritten (i.e., table location 3 in FIG. 3C).

At step 425 of FIG. 4A, the overwrite takes place to thereby shift the SOF address stored in the lower table slot (i.e., 4) up to the higher slot (i.e., 3) and thereby create part of the condition shown in FIG. 3D. However, in the general case, slot 4 may not be the bottom most slot of the batch list defined by pointers P319a and P319b. Accordingly, in step 427 the pointer is decremented and in step 430 it is compared against the contents of register 319b to determine if they are equal. If yes, then at step 435 the value in register 319b is decremented by one (thereby creating the new end pointer P319b' shown in FIG. 3D) and an exit is taken at step 439.

On the other hand, if the answer to comparison test 430 had been no, control is passed to step 415 and yet another shift of the next table entry is performed. This is repeated until the answer to comparison test 430 is yes, at which point the last entry in the original batch list has been shifted up and pointer P319b can now be updated to its new value P319b' of FIG. 3D.

Figure 4B:
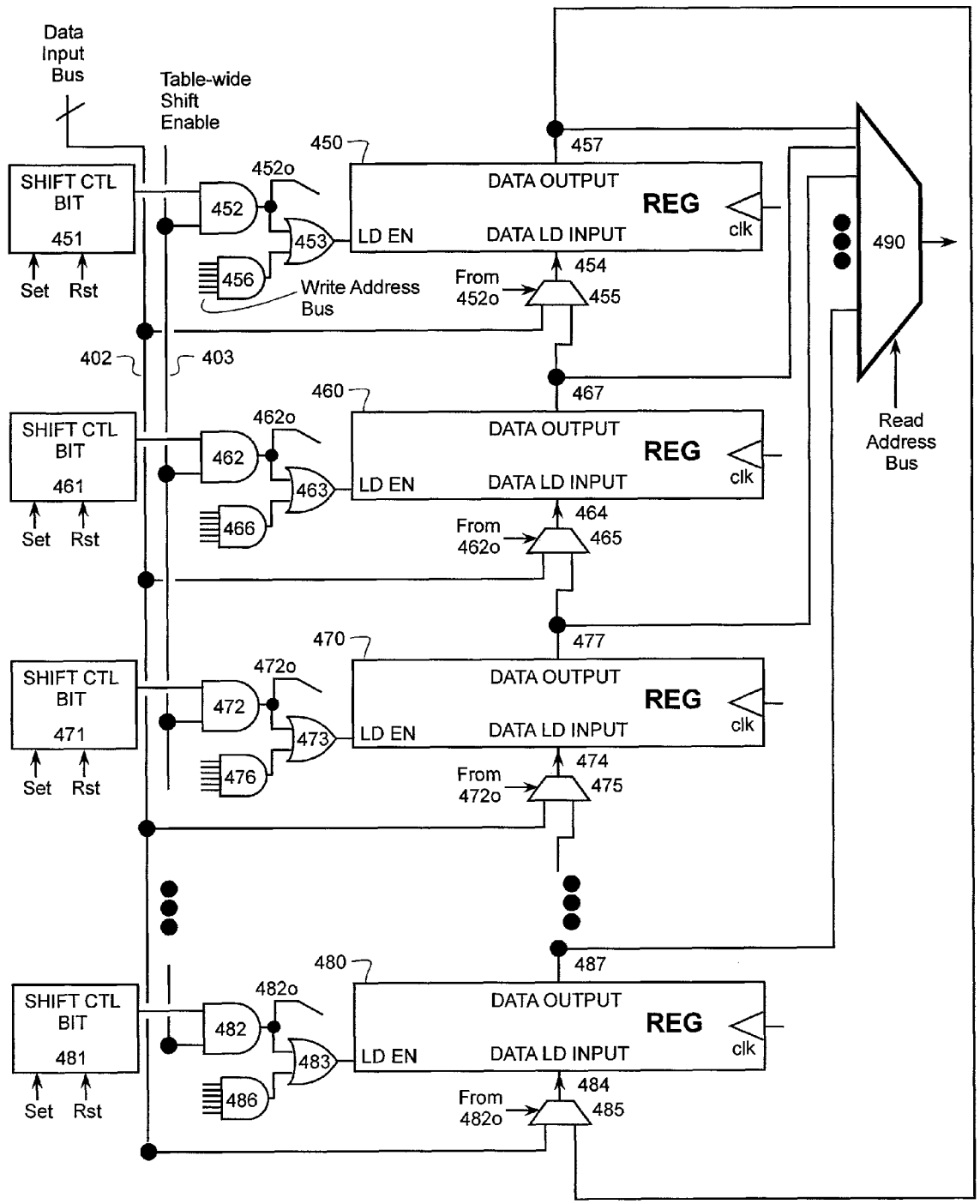
FIG. 4B is a schematic of a register based, circular index table structure that can perform a group shift in a single clock cycle.

Referring to FIG. 4B, another automated process for shifting data in an index table in accordance with the principles of FIG. 3D is detailed. A circular loop of registers 450, 460, . . . 480 is provided in index structure 401 for storing the SOF addresses of replayable packet payloads. Multiplexer 490 receives a read address and outputs the SOF contents of the addressed register 450, 460, . . . 480. Individual SOF addresses are written into individual ones of registers 450-480 by placing the write data on bus 402 and applying a specific register index number to activate a corresponding one of address recognizing AND gates 456, 466, . . . 486. The individual register (e.g., 450) that is addressed by its index value receives the data from input bus 402 by way of its respective input multiplexer (e.g., 455) and the load enable (write enable) terminal of the selected register (e.g., 450) is strobed by an enable signal that passes through the enable OR gate (e.g., 453) in synchronism with a system clock pulse applied to the clk terminal of the register.

A group shift and overwrite operation is undertaken as follows. Each of the index-addressed registers 450, 460, . . . 480 has a corresponding shift-control bit holding register 451, 452, . . . , 482 associated with it. After Reset of all the shift-control bit holding registers 451-481, the shift-control bit holding register (e.g., 471) of the register (e.g., 470) storing the SOF of the late nullified packet is Set. The shift-control bit holding registers (e.g., . . . -481) of the registers (e.g., . . . -480) whose index numbers fit in the wrap-around index range starting from that of the first set register (e.g., 470) to that pointed to by pointer 319b (FIG. 3A) are also Set to thereby specify the group of registers whose contents will be simultaneously up-shifted from one to the next in accordance with the arrangement shown in FIG. 4B. When the table-wide shift enable line 403 is asserted during an appropriate clock cycle, all the SOF-holding registers (450-480) whose shift-control bit holding registers (451-481) are set, will load with the contents of the SOF-holding registers below them. The output 452o of shift-enabling AND gate 452 couples to the control of multiplexer 455 so that multiplexer output 454 produces the output 467 of lower register 460 rather than the signal on the data input bus 402 during a shift operation. The same is true for shift-enabling AND gates 462-482 and their respective multiplexers 465-485.

It is to be noted that index structure 401 constitutes a circular buffer where the output 457 of top register 450 couples to an input of multiplexer 485 so that index values stored in the pointer registers, 319a and 319b can keep advancing continuously around the circular buffer in wrap around style without need for reset due to hitting an end of table.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of a further example, it is understood that other arrangements besides use of a single address input (322) into the index table may be used. The index table may have separate address input ports for read and write purposes. Alternatively or additionally, where separate read versus write ports are shown for memory data and address signals, memory units may be used where these are provided by multiplexed ports and use of read-enable and write enable signals for designating type of operation. Although index table 330 is shown to use the index signal 322 as a direct address input, it is within the contemplation of the disclosure to use a CAM style memory (content addressable memory) for the index table where the index number is stored as part of the memory content.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A retry packet storing and selective bypassing method comprising:
   (a) using a less significant portion of a sequence number assigned to a first packet stored in a replay buffer for generating a first index signal referencing a first location of an index table;
   (b) determining a start address assigned to the stored first packet within the replay buffer;
   (c) recording the determined start address or an indirect pointer to that determined start address of the first packet in the first location of the index table such that the start address or other pointer is retrievable from the index table by using the generated first index signal as a reference to the first location;
   (d) using the index table to locate within, and replay from the replay buffer, one or more packets that have been once-played-out-but-not-yet-acknowledged; and
   (e) in response to detection that the first packet has been nullified, overwriting the start address or indirect pointer in the index table so as to thereby prevent the nullified first packet from being replayed from the replay buffer after the nullified state of the first packet is detected.

2. The retry packet storing and selective bypassing method of claim 1 and further comprising:
   (f) detecting an end address for the first packet during read out from the replay buffer of the first packet and in response to said detection of the end address, generating an error checking code for the contents of the first packet.

3. The retry packet storing and selective bypassing method of claim 1 wherein:
   (a.1) said less significant portion consists of a least significant 5 bits of the sequence number.

4. The retry packet storing and selective bypassing method of claim 1 wherein:
   (a.1) said less significant portion consists of a least significant 4 bits of the sequence number.

5. The retry packet storing and selective bypassing method of claim 1 wherein:
   (a.1) said less significant portion consists of a least significant 3 bits of the sequence number.

6. The retry packet storing and selective bypassing method of claim 1 wherein:
   (a.1) upon being replayed, said first packet is formatted in accordance with a PCI-Express protocol to include a sequence number signal and an error checking code.

7. The retry packet storing and selective bypassing method of claim 1 wherein:
   (b.1) said start address is assigned to the first packet by a write address sequencer operating at a first rate and said determining of the start address includes using a read address sequencer operating at a second rate that is slower than the first rate.

8. The retry packet storing and selective bypassing method of claim 1 wherein:
   (d.1) said locating of the one or more packets uses a sequence number renumber returned from a downstream link partner to generate a read address signal applied to the first index table to thereby reference the start address in the replay buffer of the one or more packets that have been once-played-out-but-not-yet-acknowledged.

9. The retry packet storing and selective bypassing method of claim 1 wherein:
   (d.1) the index table operates as a content addressable memory (CAM) and said locating of the one or more packets uses a sequence number renumber returned from a downstream link partner to generate a content addressable query applied to a content addressing input of the index table to thereby reference the start address in the replay buffer of the one or more packets that have been once-played-out-but-not-yet-acknowledged.

10. A retry packet locating and selective fetching method comprising:
    (a) using a less significant portion of a sequence number of a packet to be fetched from a retry buffer for generating an index referencing a first location of an index table;
    (b) obtaining a start-of-frame address or other locater for the to-be-fetched packet from the first location of the index table;
    (c) fetching the packet from the retry buffer according to the start-of-frame address or other locater obtained from the first location of the index, table; and
    (d) selectively deleting from the index table, one or more start-of-frame address or other locaters corresponding to nullified packets that are not to be fetched from the retry buffer.

11. The retry packet locating and selective fetching method of claim 10 wherein:
    (d.1) said selective deleting is in response to detection of a soft error within a given packet.

12. The retry packet locating and selective fetching method of claim 10 wherein:
    (d.1) said selective deleting is in response to late nullification by a core processor of a given packet stored in the retry buffer.

13. The retry packet locating and selective fetching method of claim 10 wherein:
    (a.1) said less significant portion consists of a least significant 5 bits of the sequence number.

14. The retry packet locating and selective fetching method of claim 10 wherein:
    (a.1) said less significant portion consists of a least significant 4 bits of the sequence number.

15. The retry packet locating and selective fetching method of claim 10 wherein:
    (a.1) said less significant portion consists of a least significant 3 bits of the sequence number.

16. The retry packet locating and selective fetching method of claim 10 wherein:
    (a.1) after fetching said one or more packets retrieved from the retry buffer are formatted in accordance with a PCI-Express protocol to include unique sequence numbers and error checking code.

17. The retry packet locating and selective fetching method of claim 10 and further comprising:
    (e) applying the start-of-frame address or other locater obtained from the first location of the index table to read sequencer that operates a sequencing rate different from one used to write the packets into the retry buffer.

18. A retry buffer managing system comprising:
    (a) a replay buffer;

(b) an index table for storing locaters of to-be-located and fetched packets that are stored in the replay buffer;

(c) an index generator coupled to the index table for generating indexes referencing locaters in the index table, where the index generator is at least responsive to sequence numbers associated with packets to be stored in and later located and fetched from the retry buffer;

(d) a selective deletor structured to selectively delete from the index table, locaters of nullified packets that are no longer to be fetched from the replay buffer even though the nullified packets are not-yet-acknowledged packets;

(a.1) wherein the replay buffer is operatively coupled to the index table so as to receive fetch start addresses derived from locaters of the index table where the locaters are stored in the index table according to said indexes generated by the index generator.

19. The retry buffer managing system of claim 18 and further comprising:

(e) a validity checker for testing validity of sequence numbers directed to the index generator when such applied sequence numbers are to be used for locating and fetching packets from the replay buffer.

20. The retry buffer managing system of claim 19 wherein the validity checker includes means for determining whether a supplied sequence number is in a range between a first sequence number provided in a last-received acknowledgment message and a second sequence number provided in a last-sent and to-be-acknowledged packet.

21. The retry buffer managing system of claim 20 wherein the validity checker causes invalid sequence numbers to be ignored by the index generator.

22. The retry buffer managing system of claim 21 and further comprising:

(e) a timer for detecting if a last-sent and to-be-acknowledged packet has not been acknowledged within a predefined time limit, the timer being operatively coupled to the index generator for causing the index generator to generate an index referencing the locater of the last-sent and to-be-acknowledged packet so that the last-sent and to-be-acknowledged packet is automatically resent from the retry buffer after said predefined time limit has lapsed provided said once-played-out-but-not-yet-acknowledged packet has not had its locater deleted from the index table by said selective deletor.

23. The retry buffer managing system of claim 21 and further comprising:

(e) an acknowledgement detector operatively coupled to the index generator for causing the index generator to generate an index-referencing the locater of a sent and acknowledged packet so that storage space for the sent and acknowledged packet can be reallocated as free space within the replay buffer after said sent and acknowledged packet is acknowledged.

24. A data resending system for saving copies of sent packets and resending a respective packet copy if receipt of the corresponding sent packet is not timely acknowledged, the resending system comprising:

(a) an index table for storing locaters of to-be-located and resent packet copies;

(b) an index generator coupled to the index table for generating indexes referencing locaters in the index table, where the index generator is at least responsive to sequence numbers associated with the sent packets; and (c) an index table entry deletor for selectively deleting from the index table, entries corresponding to nullified packets;

(a.1) wherein fetch start addresses for fetching and resending the respective packet copies that are to be resent are derived from the locaters of the index table and the locaters are obtained from the index table according to said indexes generated by the index generator.

* * * * *